US010025012B2

(12) United States Patent
Sato et al.

(10) Patent No.: US 10,025,012 B2
(45) Date of Patent: Jul. 17, 2018

(54) POLARIZING PLATE AND LIQUID CRYSTAL DISPLAY DEVICE

(71) Applicant: FUJIFILM Corporation, Tokyo (JP)

(72) Inventors: Hiroshi Sato, Kanagawa (JP); Akira Yamamoto, Kanagawa (JP); Yujiro Yanai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 15/177,776

(22) Filed: Jun. 9, 2016

(65) Prior Publication Data

US 2016/0291225 A1 Oct. 6, 2016

Related U.S. Application Data

(63) Continuation of application No. PCT/JP2015/050730, filed on Jan. 14, 2015.

(30) Foreign Application Priority Data

Jan. 22, 2014 (JP) ................................ 2014-009938

(51) Int. Cl.
*G02F 1/1335* (2006.01)
*G02B 5/30* (2006.01)
(Continued)

(52) U.S. Cl.
CPC ............. *G02B 5/3016* (2013.01); *G02B 1/14* (2015.01); *G02F 1/1335* (2013.01);
(Continued)

(58) Field of Classification Search
CPC ....... G02B 5/3016; G02B 1/14; G02F 1/1335; G02F 1/133528; G02F 1/13363;
(Continued)

(56) References Cited

U.S. PATENT DOCUMENTS

2007/0200987 A1 8/2007 Yoda et al.
2007/0279553 A1 12/2007 Yoda et al.
2009/0091692 A1 * 4/2009 Nagai .............. G02F 1/133634
349/96

FOREIGN PATENT DOCUMENTS

JP 2002-055341 A 2/2002
JP 2005-257711 A 9/2005
(Continued)

OTHER PUBLICATIONS

International Preliminary Report on Patentability issued by WIPO dated Aug. 4, 2016, in connection with International Patent Application No. PCT/JP2015/050730.
(Continued)

*Primary Examiner* — Nathanael R Briggs
(74) *Attorney, Agent, or Firm* — Edwards Neils LLC; Jean C. Edwards, Esq.

(57) ABSTRACT

The present invention provides a polarizing plate where, when the polarizing plate is applied to a liquid crystal display device, both thinning of the device and improvement in display performance such as prevention of light leakage, prevention of color variation, and suppression of display unevenness under a moist and hot environment can be achieved. The polarizing plate has, in this order, a first polarizer protective layer, a first polarizer, a first optically anisotropic layer including a liquid crystal compound X, and a second optically anisotropic layer including a liquid crystal compound Y, in which the thickness of the first optically anisotropic layer is 10 μm or less, the first optically anisotropic layer has predetermined Re(550) and Rth(550), the thickness of the second optically anisotropic layer is 10 μm or less, and has predetermined Re(550) and Rth(550), and the polarizing plate has a thickness of is 100 μm or less.

20 Claims, 2 Drawing Sheets

(51) Int. Cl.
*G02F 1/13363* (2006.01)
*G02B 1/14* (2015.01)

(52) U.S. Cl.
CPC .... *G02F 1/13363* (2013.01); *G02F 1/133528* (2013.01); *G02F 1/133634* (2013.01); *G02F 2001/133531* (2013.01); *G02F 2001/133562* (2013.01); *G02F 2413/08* (2013.01)

(58) Field of Classification Search
CPC ... G02F 1/133634; G02F 2001/133531; G02F 2001/133562; G02F 2413/08
See application file for complete search history.

(56) References Cited

FOREIGN PATENT DOCUMENTS

| | | | | |
|---|---|---|---|---|
| JP | 2006-251439 | A | | 9/2006 |
| JP | 2006-267625 | A | | 10/2006 |
| JP | 2007-233014 | A | | 9/2007 |
| JP | 2007233014 | A | * | 9/2007 |

OTHER PUBLICATIONS

International Search Report issued in PCT/JP2015/050730 dated Mar. 17, 2015.

Notification of Reasons for Refusal issued by the Japanese Patent Office dated Apr. 18, 2017, in connection with Japanese Patent Application No. 2015-558809.

Notification of Reason for Refusal issued by the Korean Intellectual Property Office dated May 16, 2017, in connection with Korean Patent Application No. 10-2016-7016212.

First Office Action issued by the State Intellectual Property Office of China dated Dec. 4, 2017, in connection with Chinese Patent Application No. 201580004410.6.

Notification of Reason for Refusal issued by the Korean Intellectual Property Office dated Dec. 28, 2017, in connection with Korean Patent Application No. 10-2016-7016212.

Decision of Refusal issued by the Japanese Patent Office dated Jan. 23, 2018, in connection with Japanese Patent Application No. 2015-558809.

* cited by examiner

POLARIZING PLATE AND LIQUID CRYSTAL DISPLAY DEVICE

CROSS-REFERENCE TO RELATED APPLICATIONS

This application is a Continuation of PCT International Application No. PCT/JP2015/050730 filed on Jan. 14, 2015, which was published under PCT Article 21(2) in Japanese, and which claims priority under 35 U.S.C. § 119(a) to Japanese Patent Application No. 2014-009938 filed on Jan. 22, 2014. The above applications are hereby expressly incorporated by reference, in their entirety, into the present application.

BACKGROUND OF THE INVENTION

1. Field of the Invention

The present invention relates to a polarizing plate and particularly relates to a polarizing plate having two optically anisotropic layers exhibiting a predetermined retardation.

The present invention also relates to a liquid crystal display device including a polarizing plate.

2. Description of the Related Art

Liquid crystal display devices of a horizontal electric field drive mode, such as an in-plane switching (IPS) mode and a fringe field switching (FFS) mode, having satisfactory viewing characteristics, have been drawing attention. Particularly, an IPS mode is disclosed in, for example, JP2002-55341A and has an advantage of having viewing angle characteristics superior to those of liquid crystal display devices of a twisted nematic (TN) mode and a vertical alignment (VA) mode.

SUMMARY OF THE INVENTION

On the other hand, in recent years, liquid crystal display devices have become thinner and accordingly, there has been a demand to make members to be used (for example, a polarizing plate) thin.

In addition, tint differences may still occur in a liquid crystal cell of an IPS mode or a FFS mode in which a liquid crystal compound is aligned by photo alignment, a rubbing treatment, and the like depending on the observation position and there is a demand for improvement thereof. Particularly, in the case in which a liquid crystal cell substrate is rubbed and a liquid crystal compound is aligned, the liquid crystal compound is not aligned to be completely parallel with the surface of the liquid crystal cell substrate and is aligned such that the surface of the substrate and the longitudinal direction of the liquid crystal compound form a tilt angle with respect to the thickness direction particularly near the surface of the substrate in most cases. Therefore, when observed from a direction oblique to the liquid crystal cell, the tint differences becomes more significant depending on the observation position and there is ample room for improvement.

In addition, further improvement with respect to light leakage when viewing from an oblique direction has been required.

Further, the performance required for a liquid crystal display device is that display unevenness does not occur even after the liquid crystal display device is left to stand under a moist and hot environment. However, it has been found that in liquid crystal display devices of the related art, a member to be laminated on a liquid crystal cell, such as a polarizer, easily becomes deformed under a moist and hot environment and thus the optical properties (retardation) of an optically anisotropic layer which functions as an optical compensation sheet to be laminated on the liquid crystal cell change, thereby easily causing display unevenness.

That is, there has been a demand to achieve both thinning and good display performance (prevention of color variation, prevention of light leakage, and suppression of display unevenness under a moist and hot environment) of a liquid crystal display device. However, this demand cannot be satisfied in the related art.

In consideration of the above circumstances, an object of the present invention is to provide a polarizing plate in which, when the polarizing plate is applied to a liquid crystal display device, both thinning of the device and improvement in display performance such as prevention of light leakage, prevention of color variation, and suppression of display unevenness under a moist and hot environment can be achieved.

In addition, another object of the present invention is to provide a liquid crystal display device including a polarizing plate.

As a result of intensive investigations to solve the above problems, the present inventors have found that the above problems can be solved by using a polarizing plate comprising an optically anisotropic layer satisfying a predetermined retardation relationship and obtained by thinning the optically anisotropic layer and thus completed the present invention.

That is, the present inventors have found that the above problems can be solved by the following constitutions.

(1) A polarizing plate comprising, in this order: a first polarizer protective layer; a first polarizer; a first optically anisotropic layer including a liquid crystal compound X; and a second optically anisotropic layer including a liquid crystal compound Y, wherein the thickness of the first optically anisotropic layer is 10 μm or less, the first optically anisotropic layer satisfies the following expressions (1-1) and (1-2):

$$95\ \text{nm} \leq Re(550) \leq 155\ \text{nm; and} \qquad \text{Expression (1-1)}$$

$$45\ \text{nm} \leq Rth(550) \leq 80\ \text{nm,} \qquad \text{Expression (1-2)}$$

the thickness of the second optically anisotropic layer is 10 μm or less, the second optically anisotropic layer satisfies the following expressions (1-3) and (1-4):

$$Re(550) \leq 10\ \text{nm; and} \qquad \text{Expression (1-3)}$$

$$-135\ \text{nm} \leq Rth(550) \leq -75\ \text{nm, and} \qquad \text{Expression (1-4)}$$

the polarizing plate has a thickness of 100 μm or less, (wherein Re(550) represents an in-plane retardation at a wavelength of 550 nm and Rth(550) represents a retardation in a thickness direction at a wavelength of 550 nm).

(2) The polarizing plate according to (1), wherein at least one of the liquid crystal compound X or the liquid crystal compound Y is a rod-like liquid crystal compound, and when the surface of the first polarizer protective layer is observed from a normal direction, an angle formed between a slow axis of the first optically anisotropic layer and an absorption axis of the first polarizer is 90°.

(3) A polarizing plate comprising, in this order: a first polarizer protective layer; a first polarizer; a first optically anisotropic layer including a liquid crystal compound X; and a second optically anisotropic layer including a liquid crystal compound Y, wherein the thickness of the first optically anisotropic layer is 10 μm or less, the first optically anisotropic layer satisfies the following expressions (2-1) and (2-2):

$Re(550)\leq 10$ nm; and  Expression (2-1)

$40\text{ nm}\leq Rth(550)\leq 115$ nm  Expression (2-2)

the thickness of the second optically anisotropic layer is 10 μm or less, the second optically anisotropic layer satisfies the following expressions (2-3) and (2-4):

$125\text{ nm}\leq Re(550)\leq 185$ nm; and  Expression (2-3)

$-95\text{ nm}\leq Rth(550)\leq -60$ nm, and  Expression (2-4)

the polarizing plate has a thickness of 100 μm or less, (wherein Re(550) represents an in-plane retardation at a wavelength of 550 nm and Rth(550) represents a retardation in a thickness direction at a wavelength of 550 nm).

(4) The polarizing plate according to (3), wherein at least one of the liquid crystal compound X or the liquid crystal compound Y is a discotic liquid crystal compound, and when the surface of the first polarizer protective layer is observed from a normal direction, an angle formed between a slow axis of the second optically anisotropic layer and an absorption axis of the first polarizer is 90°.

(5) A polarizing plate comprising, in this order: a first polarizer protective layer; a first polarizer; a first optically anisotropic layer including a liquid crystal compound X; and a second optically anisotropic layer including a liquid crystal compound Y, wherein the thickness of the first optically anisotropic layer is 10 μm or less, the first optically anisotropic layer satisfies the following expressions (3-1) and (3-2):

$40\text{ nm}\leq Re(550)\leq 110$ nm; and  Expression (3-1)

$20\text{ nm}\leq Rth(550)\leq 55$ nm,  Expression (3-2)

the thickness of the second optically anisotropic layer is 10 μm or less, the second optically anisotropic layer satisfies the following expressions (3-3) and (3-4):

$90\text{ nm}\leq Re(550)\leq 155$ nm; and  Expression (3-3)

$-80\text{ nm}\leq Rth(550)\leq -45$ nm, and  Expression (3-4)

the polarizing plate has a thickness of 100 μm or less, (wherein Re(550) represents an in-plane retardation at a wavelength of 550 nm and Rth(550) represents a retardation in a thickness direction at a wavelength of 550 nm).

(6) The polarizing plate according to (5), wherein the liquid crystal compound X is a rod-like liquid crystal compound, the liquid crystal compound Y is a discotic liquid crystal compound, and when the surface of the first polarizer protective layer is observed from a normal direction, an angle formed between a slow axis of the first optically anisotropic layer and an absorption axis of the first polarizer is 90° and an angle formed between a slow axis of the second optically anisotropic layer and an absorption axis of the first polarizer is 90°.

(7) The polarizing plate according to any one of (1) to (6), wherein at least one of the first optically anisotropic layer or the second optically anisotropic layer satisfies the following requirement (A) or (B):

$Re(550)>10$ nm and $0.83\leq Re(450)/Re(550)<1.16$ are satisfied; and  Requirement (A):

$Re(550)\geq 10$ nm and $0.83\leq R[40°,450])/(R[40°,550])<1.16$ are satisfied,  Requirement (B):

(wherein Re(550) represents an in-plane retardation at a wavelength of 550 nm, Rth(550) represents a retardation in a thickness direction at a wavelength of 550 nm, R[40°, 450] represents a retardation measured at a wavelength of 450 nm in a direction inclined at 40° from the direction normal to the surface of the optically anisotropic layer, and R[40°, 550] represents a retardation measured at a wavelength of 550 nm in a direction inclined at 40° from the normal direction of the surface of the optically anisotropic layer).

(8) The polarizing plate according to any one of (1) to (7), wherein the first polarizer is in direct contact with the first optically anisotropic layer.

(9) The polarizing plate according to any one of (1) to (7), wherein an alignment film is disposed between the first polarizer and the first optically anisotropic layer.

(10) The polarizing plate according to any one of (1) to (7), wherein an adhesive layer is disposed between the first polarizer and the first optically anisotropic layer.

(11) A liquid crystal display device comprising, in this order: a first polarizing plate including a polarizer; an IPS mode or a FFS mode liquid crystal cell including a liquid crystal layer having a liquid crystal compound; and a second polarizing plate including a polarizer, wherein an absorption axis of the polarizer in the first polarizing plate is perpendicular to an absorption axis of the polarizer in the second polarizing plate, and either the first polarizing plate or the second polarizing plate is the polarizing plate according to any one of (1) to (10), and the second optically anisotropic layer is disposed on the liquid crystal cell side.

(12) The liquid crystal display device according to (11), wherein the first polarizing plate is disposed on a visible side, the first polarizing plate is the polarizing plate according to any one of (1) to (10), the second polarizing plate has a second polarizer protective layer, a second polarizer, and a third optically anisotropic layer including a liquid crystal compound Z, the third optically anisotropic layer is disposed on a liquid crystal cell side, a slow axis of the third optically anisotropic layer is parallel with a slow axis of the liquid crystal layer in a state in which voltage is not applied, and the liquid crystal compound Z has an average tilt angle in the same direction as the average tilt direction of the liquid crystal compound in the liquid crystal layer with respect to the surface of the liquid crystal layer.

(13) The liquid crystal display device according to (12), wherein the thickness of the third optically anisotropic layer is 10 μm or less, and the third optically anisotropic layer satisfies the following expression (4-1):

$10\text{ nm}\leq Re(550)\leq 120$ nm, and  Expression (4-1)

the average tilt angle of the liquid crystal compound Z is 1° to 20°.

(14) The liquid crystal display device according to (12) or (13), wherein the liquid crystal compound Z is a rod-like liquid crystal compound.

(15) The liquid crystal display device according to any one of (12) to (14), wherein the liquid crystal compound Z forms a smectic phase.

(16) The liquid crystal display device according to any one of (12) to (15), wherein the third optically anisotropic layer satisfies the following expression (I):

$$0.83 \leq Re(450)/Re(550) < 1.1 \quad \text{Expression (I)}$$

(Re(550) represents an in-plane retardation at a wavelength of 550 nm and Re(450) represents an in-plane retardation at a wavelength of 450 nm).

(17) The liquid crystal display device according to any one of (12) to (16), wherein the second polarizer is in direct contact with the third optically anisotropic layer.

(18) The liquid crystal display device according to any one of (12) to (16), wherein an alignment film is disposed between the second polarizer and the third optically anisotropic layer.

(19) The liquid crystal display device according to any one of (12) to (16), wherein an adhesive layer is disposed between the second polarizer and the third optically anisotropic layer.

(20) The polarizing plate according to any one of (1) to (10), wherein the moisture permeability of the first polarizer protective layer at 40° C. and 90% RH is 100 g/m$^2$·day or less (wherein the moisture permeability is a value obtained by a method of JIS Z-0208 after 24 hours have passed at 40° C. and a relative humidity of 90%).

(21) The liquid crystal display device according to any one of (12) to (19), wherein the moisture permeability of at least one of the first polarizer protective layer or the second polarizer protective layer at 40° C. and 90% RH is 100 g/m$^2$·day or less (wherein the moisture permeability is a value obtained by a method of JIS Z-0208 after 24 hours have passed at 40° C. and a relative humidity of 90%).

According to the present invention, it is possible to provide a polarizing plate in which, when the polarizing plate is applied to a liquid crystal display device, both thinning of the device and improvement in display performance such as prevention of light leakage, prevention of color variation, and suppression of display unevenness under a moist and hot environment can be achieved.

According to the present invention, it is also possible to provide a liquid crystal display device including a polarizing plate.

DESCRIPTION OF THE PREFERRED EMBODIMENTS

Figure 1:
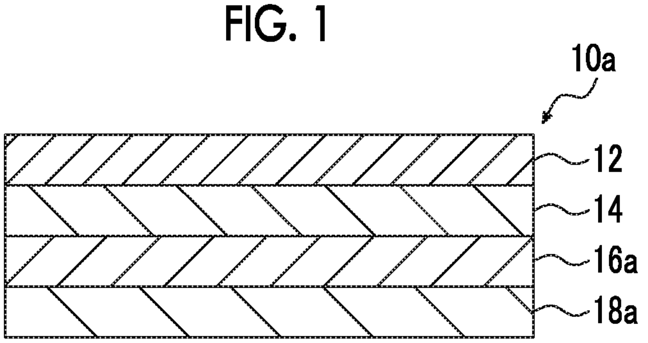
FIG. 1 is a cross-sectional view showing one embodiment of a polarizing plate according to a first embodiment of the present invention.

Hereinafter, the present invention will be described in detail. The numerical range represented by the term "to" in the specification includes the numerical values set forth before and after "to" as lower and upper limits, respectively.

In the specification, Re(λ) and Rth(λ) represent an in-plane retardation and a retardation in a thickness direction at a wavelength λ, respectively. Re(λ) is measured by applying incident light having a wavelength of λ nm to a film in the normal direction of the film using KOBRA 21ADH or WR (manufactured by Oji Scientific Instruments). The selection of the measurement wavelength λ nm can be conducted according to the manual-exchange of the wavelength selective filter or according to the exchange of the measurement value by the program. In the case in which the film to be measured is represented by a uniaxial or biaxial index ellipsoid, Rth(λ) is calculated by the following method. This measurement method is partially applied to the measurement of the average tilt angle of the liquid crystal compound in the liquid crystal layer and a third optically anisotropic layer, which will be described later.

A total of six points of Re(λ) are measured by applying incident light having a wavelength of λ nm to a film from each of the inclined directions at an angle increasing in 10° step increments up to 50° in one direction from the normal direction with respect to the film normal direction by taking the in-plane slow axis (determined by KOBRA 21ADH or WR) as an inclined axis (axis of rotation) (in the case in which there is no slow axis, an arbitrary in-plane direction of the film will be taken as an axis of rotation), and then Rth(λ) is calculated by KOBRA 21ADH or WR based on the retardation value measured, the assumed value of the average refractive index, and the film thickness value inputted. In the above description, in the case of a film having a direction in which a retardation value is zero at a certain tilt angle from the normal direction by taking the in-plane slow axis as an axis of rotation, a retardation value at a tilt angle greater than the tilt angle is changed into a minus sign and then is calculated by KOBRA 21ADH or WR. Rth can also be calculated based on retardation values measured from two arbitrary inclined directions by taking the slow axis as an inclined axis (axis of rotation) (in the case in which there is no slow axis, an arbitrary in-plane direction of the film will be taken as an axis of rotation), the assumed value of the average refractive index, and the film thickness inputted and from the following expressions (A) and (III).

Expression (A)

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left(\sin^{-1}\left(\frac{\sin(-\theta)}{nx}\right)\right)}$$

Re(θ) represents a retardation value in a direction inclined by an angle θ from the normal direction. In the expression (A), nx represents a refractive index in an in-plane slow axis direction, ny represents a refractive index in an in-plane direction perpendicular to nx, and nz represents a refractive index in a direction perpendicular to nx and ny.

$$Rth=((nx+ny)/2-nz)\times d \quad \text{Expression (III)}$$

In the case in which a film to be measured cannot be represented by a uniaxial or biaxial index ellipsoid, so-called, the case in which the film has no optic axis, Rth(λ) is calculated by the following manner. Eleven points of Re(λ) are measured by applying an incident light having a wavelength of λ nm to a film from each of the inclined directions at an angle increasing in 10° step increments from −50° to +50° from the film normal direction by taking the in-plane slow axis (determined by KOBRA 21ADH or WR) as an inclined axis (axis of rotation), and then Rth(λ) is calculated by KOBRA 21 ADH or WR based on the retardation value measured, the assumed value of the average refractive index, and the film thickness value inputted. In addition, in the above measurements, values described in a polymer handbook (JOHN WILEY&SONS, INC), and catalogues of various optical films can be used as the assumed value of the average refractive index. For films whose average refractive index value is unknown, the value may be measured by using an Abbe's refractometer. Values of average refractive index of main optical films are illustrated below: cellulose acylate (1.48); cycloolefin polymer (1.52); polycarbonate (1.59); polymethyl methacrylate (1.49); and polystyrene (1.59). By inputting the assumed value of the average refractive index and the film thickness, KOBRA 21ADH or WR calculates nx, ny, and nz. Nz=(nx−nz)/(nx−ny) is further calculated by the calculated nx, ny, and nz.

Re and Rth are measured at a visible light region λ=550 nm, unless otherwise specified.

The average tilt angle of the liquid crystal compound can be obtained by a crystal rotation method.

In addition, in the specification, the angle relationship (for example, "perpendicular", "parallel", "90°", and the like) includes errors in the error range allowable in the technical field to which the present invention belongs. Specifically, the error is within a range of the exact angle ± smaller than 10° and the error from the exact angle is preferably 5° or smaller and more preferably 3° or smaller.

The present invention is characterized in that a desired effect can be obtained by using a polarizing plate comprising an optically anisotropic layer satisfying a predetermined retardation relationship as described above. The optically anisotropic layer functions as a so-called optical compensation layer. Particularly, in the related art, in order to improve the tint of black display, the phase difference of the optical compensation layer has to be made to have strong reversed dispersion (Re(450)/Re(550) to 0.82), which is very difficult to be realized. However, in the present invention, it is possible to improve the tint of black display by satisfying a predetermined retardation relationship without strong reversed dispersion. In addition, by reducing the thickness of the optically anisotropic layer, when a liquid crystal display device is left to stand under a moist and hot environment and the polarizer or the like are deformed, even in the case in which the optically anisotropic layer is deformed together with the polarizer or the like, optical properties (retardation) hardly change and as a result, display unevenness is prevented from occurring.

<<Polarizing Plate>>

First Embodiment

Hereinafter, a first embodiment of the polarizing plate of the present invention will be described with reference to the drawings. FIG. 1 shows a cross-sectional view showing a first embodiment of a polarizing plate according to the present invention. The drawings in the present invention are schematic drawings and the thickness and positional relationships between respective layers do not necessarily correspond to actual thickness and positional relationships. The same will be applied to the following drawings.

A polarizing plate **10*a* comprises a first polarizer protective layer 12, a first polarizer 14, a first optically anisotropic layer 16*a*, and a second optically anisotropic layer 18*a***.

Hereinafter, each member in the polarizing plate **10*a*** will be described in detail.

(First Polarizer Protective Layer 12)

The first polarizer protective layer 12 is provided to protect the first polarizer 14.

The type of the first polarizer protective layer 12 is not particularly limited and for example, films of cellulose acylate, polycarbonate, polysulfone, polyethersulfone, polyacrylate, polymethacrylate, cyclic polyolefin, polyolefin, polyamide, polystyrene, polyester, and the like can be used. Among these, films of cellulose acrylate, cyclic polyolefin, polyacrylate, and polymethacrylate are preferable. In addition, a commercially available cellulose acetate film (such as "TD80U" or "Z-TAC" manufactured by Fujifilm Corporation) can be used.

The first polarizer protective layer 12 may be only one layer or a laminate having two or more layers.

The thickness of the first polarizer protective layer 12 is not particularly limited. However, from the viewpoint of thinning of a liquid crystal display device, the thickness is preferably 80 μm or less, more preferably 40 μm or less, and still more preferably 25 μm or less. The lower limit is not particularly limited and from the viewpoint of mechanical strength, the lower limit is preferably 1 μm or more.

The first polarizer protective layer 12 is preferably a film having a low moisture permeability to suppress display unevenness and improve the durability of the polarizing plate. More specifically, the moisture permeability of the first polarizer protective layer 12 at 40° C. and 90% RH is preferably 100 $g/m^2\cdot day$ or less, more preferably 70 $g/m^2\cdot day$ or less, and still more preferably 40 $g/m^2\cdot day$ or less. The lower limit is not particularly limited. However, from the viewpoint of properties of the film, typically, the lower limit is 5 $g/m^2\cdot day$ or more in most cases.

The moisture permeability is a value measured after 24 hours have passes at 40° C. and a relative humidity of 90% by a method of JIS Z-0208.

(First Polarizer 14)

The type of the first polarizer 14 is not particularly limited and known polarizers can be employed.

In the present invention, a linear polarizer, which is typically used, can be used. The linear polarizer is preferably a coating polarizer manufactured by Optiva Inc., or a polarizer composed of a binder and iodine or a dichroic dye. Molecules of iodine or a dichroic dye in the linear polarizer are aligned in the binder to exhibit polarization performance. It is preferably that molecules of iodine or a dichroic dye are aligned along the binder molecules or molecules of a dichroic dye are aligned in a single direction by self-organization, such as in liquid crystal. A current commercially available polarizer is generally prepared through the immersion of a stretched polymer into a solution of iodine or a dichroic dye in a bath so that the iodine or the dichroic dye penetrates into a binder.

The thickness of the first polarizer 14 is not particularly limited. However, from the viewpoint of thinning of a liquid crystal display device, the thickness is preferably 30 μm or less, more preferably 15 μm or less, and still more preferably 10 μm or less. The lower limit is not particularly limited. However, from the viewpoint of mechanical strength, the lower limit is preferably 3 μm or more.

(First Optically Anisotropic Layer 16*a*)

The first optically anisotropic layer 16*a* is a layer disposed between the first polarizer 14 and the second optically anisotropic layer 18*a* which will be described later and includes a liquid crystal compound X.

Re(550) and Rth(550) of the first optically anisotropic layer 16*a* satisfy the following expressions (1-1) and (1-2).

$$95\ \text{nm} \leq Re(550) \leq 155\ \text{nm} \qquad \text{Expression (1-1)}$$

$$45\ \text{nm} \leq Rth(550) \leq 80\ \text{nm} \qquad \text{Expression (1-2)}$$

Among these, from the viewpoint of improving color display and light leakage in a liquid crystal display device including the polarizing plate of the present invention in an oblique direction (hereinafter, also simply referred to as "from the viewpoint of further enhancing the effect of the present invention"), Re(550) is preferably 100 nm to 150 nm, more preferably 105 nm to 145 nm, and still more preferably 110 nm to 140 nm. Rth(550) is preferably 50 nm to 75 nm, more preferably 52 nm to 73 nm, and still more preferably 55 nm to 70 nm.

In the case of not satisfying the relationship of the expression (1-1) or (1-2), a liquid crystal display device deteriorates in terms of color display and light leakage in the oblique direction.

Re(550) represents an in-plane retardation at a wavelength of 550 nm and Rth(550) represents a retardation in a thickness direction at a wavelength of 550 nm.

The thickness of the first optically anisotropic layer 16*a* is 10 μm or less. From the viewpoint of thinning of a liquid crystal display device, the thickness is preferably 6 μm or less, more preferably 4 μm or less, and still more preferably 2 μm or less. The lower limit is not particularly limited. However, from the viewpoint of uneven coating of the first optically anisotropic layer 16*a*, the lower limit is preferably 0.1 μm or more.

In the case in which the thickness of the first optically anisotropic layer 16*a* is more than 10 μm, the thinning of a liquid crystal display device cannot be achieved and when a liquid crystal display device is left to stand under a moist and hot environment, display unevenness easily occurs.

The first optically anisotropic layer 16*a* is preferably a positive A plate.

The type of the liquid crystal compound X is not particularly limited. However, considering the shape thereof, liquid crystal compounds can be categorized into a rod-like type (rod-like liquid crystal compound) and a disk-like type (discotic liquid crystal compound). The liquid crystal compounds in each category can be further classified into a low molecular type and a high molecular type. High-molecular compounds generally have a degree of polymerization of 100 or higher ("Polymer Physics, Dynamics of Phase transition" Masao Doi, p. 2, Iwanami Shoten, 1992). In the present invention, liquid crystal compounds of any type may be used, and rod-like or discotic liquid crystal compounds are preferably used. A mixture of two or more rod-like liquid crystal compounds, a mixture of two or more discotic liquid crystal compounds, or a mixture of a rod-like liquid crystal compound and a discotic liquid crystal compound may be used.

As the rod-like liquid crystal compound, for example, liquid crystal compounds disclosed in claim 1 of JP1999-513019A (JP-H11-513019A) and paragraphs "0026" to "0098" of JP2005-289980A can be preferably used. As the discotic liquid crystal compound, for example, liquid crystal compounds disclosed paragraphs "0020" to "0067" of JP2007-108732A and paragraphs "0013" to "0108" of JP2010-244038A can be preferably used. However, there is no limitation thereto.

Among these, in the first embodiment, from the viewpoint of further enhancing the effect of the present invention, the liquid crystal compound X is preferably a rod-like liquid crystal compound.

It is more preferable that the first optically anisotropic layer 16*a* is formed by using a rod-like liquid crystal compound or a discotic liquid crystal compound having polymerizable groups since changes in temperature and humidity can be reduced. The liquid crystal compound may be a mixture of two or more types and in this case, it is preferable at least one of these is a compound having two or more polymerizable groups.

That is, it is preferable that the first optically anisotropic layer 16*a* is a layer formed by fixing a rod-like liquid crystal compound or a discotic liquid crystal compound having polymerizable groups by polymerization or the like and in this case, after the layer is formed, there is no need to exhibit liquid crystal properties any more.

The type of the polymerizable group included in the discotic liquid crystal compound and the rod-like liquid crystal compound is not particularly limited and a functional group capable of performing an addition polymerization reaction is preferable, and a polymerizable ethylenically unsaturated group or a rig polymerizable group is more preferable. More specifically, preferable examples thereof include a (meth)acryloyl group, a vinyl group, a styryl group, and an allyl group, and a (meth)acryloyl group is more preferable.

From the viewpoint of further enhancing the effect of the present invention, when the surface of the first polarizer protective layer 12 is observed from the normal direction (when the surface is observed from the upper side to the lower side in FIG. 1), an angle formed between the slow axis of the first optically anisotropic layer 16*a* and the absorption axis of the first polarizer 14 is preferably 90°.

(Second Optically Anisotropic Layer 18*a*)

The second optically anisotropic layer 18*a* is a layer disposed on the first optically anisotropic layer 16*a* and in the case in which the polarizing plate is disposed on a liquid crystal cell, which will be described later, the second optically anisotropic layer 18*a* is disposed to be placed on the liquid crystal cell side. In the second optically anisotropic layer 18*a*, a liquid crystal compound Y is included.

Re(550) and Rth(550) of the second optically anisotropic layer 18*a* satisfy the following expressions (1-3) and (1-4).

$$Re(550) \leq 10\ \text{nm} \qquad \text{Expression (1-3)}$$

$$-135\ \text{nm} \leq Rth(550) \leq -75\ \text{nm} \qquad \text{Expression (1-4)}$$

Within the ranges, from the viewpoint of further enhancing the effect of the present invention, Re(550) is preferably 0 nm to 5 nm and more preferably 0 nm to 3 nm, and Rth(550) is preferably −130 nm to −85 nm, more preferably −125 nm to −90 nm, and still more preferably −120 nm to −95 nm.

In the case of not satisfying the relationship of the above expression (1-3) or (1-4), a liquid crystal display device deteriorates in terms of color display and light leakage in an oblique direction.

The thickness of the second optically anisotropic layer 18*a* is 10 μm or less. From the viewpoint of thinning of a liquid crystal display device, the thickness is preferably 6

μm or less, more preferably 4 μm or less, and still more preferably 2 μm or less. The lower limit is not particularly limited. However, from the viewpoint of uneven coating of the second optically anisotropic layer 18*a*, the lower limit is preferably 0.1 μm or more.

In the case in which the thickness of the second optically anisotropic layer 18*a* is more than 10 μm, thinning of a liquid crystal display device cannot be achieved and when a liquid crystal display device is left to stand under a moist and hot environment, display unevenness easily occurs.

The type of the liquid crystal compound Y is not particularly limited and examples thereof include liquid crystal compounds shown as examples in the description of the above-mentioned liquid crystal compound X. Among these, in the first embodiment, from the viewpoint of further enhancing the effect of the present invention, the liquid crystal compound Y is preferably a rod-like liquid crystal compound.

In addition, it is more preferable that the second optically anisotropic layer 18*a* is formed by using a rod-like liquid crystal compound or a discotic liquid crystal compound having polymerizable groups, similar to the above-mentioned first optically anisotropic layer 16*a*.

The second optically anisotropic layer 18*a* is preferably a positive C plate.

From the viewpoint of further enhancing the effect of the present invention, it is preferable that at least one of the first optically anisotropic layer 16*a* or the second optically anisotropic layer 18*a* satisfies the following requirement (A) or (B):

$Re(550)>10$ nm and $0.83 \leq Re(450)/Re(550)<1.16$ are satisfies; and Requirement (A):

$Re(550) \leq 10$ nm and $0.83 \leq (R[40°,450])/(R[40°,550])<1.16$ are satisfied. Requirement (B):

R[40°, 450] represents a retardation measured at a wavelength of 450 nm in a direction inclined at 40° from the normal direction of the surface of the optically anisotropic layer, and R[40°, 550] represents a retardation measured at a wavelength of 550 nm in a direction inclined at 40° from the normal direction of the surface of the optically anisotropic layer.

The production method of the polarizing plate 10*a* is not particularly limited and known production methods can be used. Hereinafter, an example thereof will be shown.

First, an optically anisotropic layer forming composition (first optically anisotropic layer forming composition) including a liquid crystal compound having polymerizable groups is applied to the surface of the first polarizer 14, and then coating film is subjected to a curing treatment. Thus, the first optically anisotropic layer 16*a* is formed. As the curing treatment, a heating treatment or a light irradiation treatment may be used.

Next, an optically anisotropic layer forming composition (second optically anisotropic layer forming composition) including a liquid crystal compound having polymerizable groups is applied to the surface of the first optically anisotropic layer 16*a* and then the coating film is subjected to a curing treatment. Thus, the second optically anisotropic layer 18*a* is formed.

Further, the first polarizer protective layer 12 is laminated on the surface of the first polarizer 14 on the opposite side of the first optically anisotropic layer 16*a*, and thus a polarizing plate is produced.

Other components may be included in the optically anisotropic layer forming composition as required, and for example, a polymerization initiator and a solvent may be included.

The thickness of the polarizing plate 10*a* having the respective configurations mentioned above is 100 μm or less, preferably 70 μm or less, more preferably 60 μm or less, and still more preferably 50 μm or less.

When the thickness is more than 100 μm, thinning of a liquid crystal display device cannot be achieved.

For example, in the embodiment of FIG. 1, the thickness of the polarizing plate 10*a* means the total thickness of the thickness of the first polarizer protective layer 12, the thickness of the first polarizer 14, the thickness of the first optically anisotropic layer 16*a*, and the thickness of the second optically anisotropic layer 18*a*.

In the case in which layers other than the above layers (for example, an alignment film, which will be described later, and the like) are included in the polarizing plate 10*a*, the thickness of the polarizing plate 10*a* refers to the entire thickness of the polarizing plate 10*a* including these layers. The layers other than the above layers refer to layers which will be disposed between the first polarizer protective layer 12 and the first polarizer 14, between the first polarizer 14 and the first optically anisotropic layer 16*a*, or between the first optically anisotropic layer 16*a* and the second optically anisotropic layer 18*a* (for example, an adhesive layer, an alignment film, and the like). Therefore, layers which will be disposed on the outer side of the first polarizer protective layer 12 (on the opposite side of the first polarizer 14) and on the outer side of the second optically anisotropic layer 18*a* (on the opposite side of the first optically anisotropic layer 16*a*) (for example, a hard coat layer and the like) are not included in the thickness of the polarizing plate.

In FIG. 1, the first polarizer 14 is in direct contact with the first optically anisotropic layer 16*a*, which is preferable for thinning of the liquid crystal display device and the polarizing plate. However, the first embodiment is not limited to this embodiment.

Figure 2:
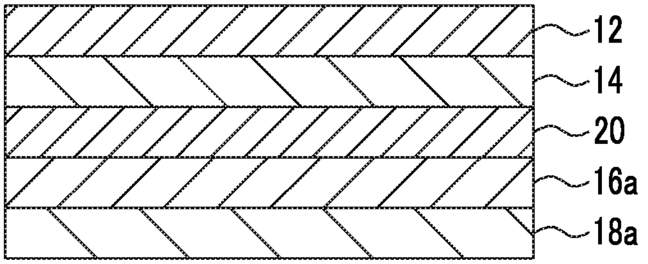
FIG. 2 is a cross-sectional view showing another embodiment of the polarizing plate according to the first embodiment of the present invention.

For example, as shown in FIG. 2, an alignment film 20 may be disposed between the first polarizer 14 and the first optically anisotropic layer 16*a*. By disposing the alignment film 20, the slow axis of the first optically anisotropic layer 16*a* is more easily controlled.

The alignment film 20 generally has a polymer as a main component. The polymer materials for the alignment film are described in various documents, and various polymers are commercially available. For the polymer material to be used, polyvinyl alcohols or polyimides and derivatives thereof are preferable. Particularly, modified or unmodified polyvinyl alcohols are preferable. Regarding the alignment film that can be used in the present invention, it is possible to refer to modified polyvinyl alcohols in the descriptions from the line 24 of p. 43 to the line 8 of p. 49 of WO01/88574A1, and paragraphs "0071" to "0095" of JP3907735B. Typically, the alignment film 20 is subjected to a known rubbing treatment. That is, it is preferable that the alignment film 20 is typically a rubbed alignment film which is subjected to a rubbing treatment.

Regarding the thickness of the alignment film 20, a thinner thickness is more preferable. However, from the viewpoint of imparting alignment performance for forming the optically anisotropic layer and forming an optically anisotropic layer having even film thickness by alleviating surface unevenness in the first polarizer 14, a certain degree of thickness is required. Specifically, the thickness of the alignment film 20 is preferably 0.01 μm to 10 μm, more preferably 0.01 μm to 1 μm, and still more preferably 0.01 μm to 0.5 μm.

In addition, in the present invention, it is preferable to use a photo alignment film. The photo alignment film is not particularly limited and films described in paragraphs "0024" to "0043" of WO2005/096041A, LPP-JP265CP (trade name) manufactured by Rolic technologies Ltd., and the like can be used.

Figure 3:
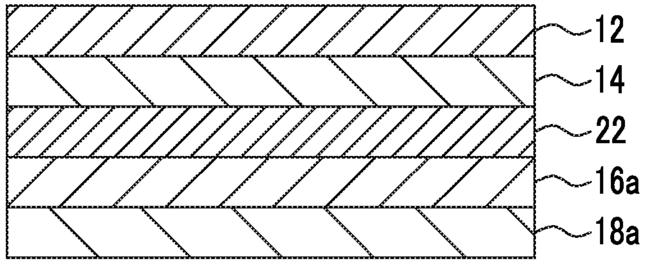
FIG. 3 is a cross-sectional view showing another embodiment of the polarizing plate according to the first embodiment of the present invention.

In addition, as shown in FIG. 3, an adhesive layer 22 may be disposed between the first polarizer 14 and the first optically anisotropic layer 16*a*. By disposing the adhesive layer 22, adhesion between the first polarizer 14 and the first optically anisotropic layer 16*a* is further improved.

The material constituting the adhesive layer 22 to be used is not particularly limited and for example, a substance having a ratio between a storage elastic modulus G' and a loss elastic modulus G" (tan δ=G"/G') as measured with a dynamic viscoelasticity measuring device of 0.001 to 1.5 is preferable and the material preferably includes so-called adhesives, easily-crcepable substances, and the like. Examples of adhesives that can be used in the present invention include polyvinyl alcohol-based adhesives. However, the adhesives are not limited thereto.

Second Embodiment

Hereinafter, a second embodiment of the polarizing plate according to the present invention will be described with reference to the drawing.

Figure 4:
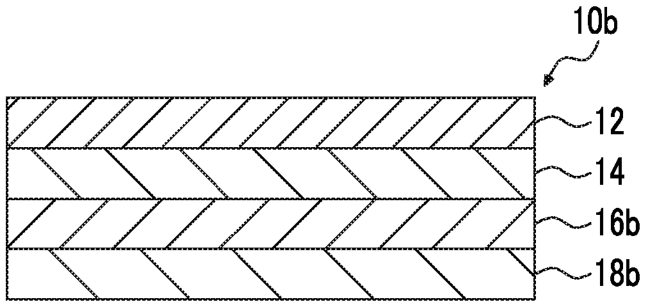
FIG. 4 is a cross-sectional view showing one embodiment of the polarizing plate according to a second embodiment of the present invention.

A polarizing plate 10*b* shown in FIG. 4 comprises a first polarizer protective layer 12, a first polarizer 14, a first optically anisotropic layer 16*b*, and a second optically anisotropic layer 18*b*.

The polarizing plate 10*b* shown in FIG. 4 has the same configuration as the configuration of the polarizing plate 10*a* shown in FIG. 1 except the first optically anisotropic layer 16*b* and the second optically anisotropic layer 18*b*. Thus, the same constitutional elements are indicated by the same reference numerals and the description thereof is omitted. The first optically anisotropic layer 16*b* and the second optically anisotropic layer 18*b* will be mainly described.

(First Optically Anisotropic Layer 16*b*)

The first optically anisotropic layer 16*b* is a layer disposed between the first polarizer 14 and the second optically anisotropic layer 18*b*, which will be described later, and includes a liquid crystal compound X.

Re(550) and Rth(550) of the first optically anisotropic layer 16*b* satisfy the following expressions (2-1) and (2-2).

$$Re(550)\leq 10\text{ nm} \quad \text{Expression (2-1)}$$

$$40\text{ nm}\leq Rth(550)\leq 115\text{ nm} \quad \text{Expression (2-2)}$$

Within the ranges, from the viewpoint of further enhancing the effect of the present invention, Re(550) is preferably 0 nm to 5 nm and more preferably 0 nm to 3 nm, and Rth(550) is preferably 45 nm to 110 nm, more preferably 55 nm to 105 nm, and still more preferably 60 nm to 100 nm.

In the case of not satisfying the relationship of the above expression (2-1) or (2-2), a liquid crystal display device deteriorates in terms of color display and light leakage in an oblique direction.

The thickness of the first optically anisotropic layer 16*b* is 10 μm or less. From the viewpoint of thinning of a liquid crystal display device, the thickness is preferably 6 μm or less, more preferably 4 μm or less, and still more preferably 2 μm or less. The lower limit is not particularly limited and from the viewpoint of uneven coating of the first optically anisotropic layer 16*b*, the lower limit is preferably 0.1 μm or more.

In the case in which the thickness of the first optically anisotropic layer 16*b* is more than 10 μm, thinning of a liquid crystal display device cannot be achieved and when a liquid crystal display device is left to stay till under a moist and hot environment, display unevenness easily occurs.

In addition, the definition of the liquid crystal compound X is as described above and out of these compounds, in the second embodiment, from the viewpoint of further enhancing the effect of the present invention, the liquid crystal compound X is preferably a discotic liquid crystal compound.

In addition, the first optically anisotropic layer 16*b* is preferably a negative C plate.

Further, the first optically anisotropic layer 16*b* is produced in the same procedure as that of the above-mentioned first optically anisotropic layer 16*a*.

(Second Optically Anisotropic Layer 18*b*)

The second optically anisotropic layer 18*b* is a layer disposed on the first optically anisotropic layer 16*b* and in the case of disposing the polarizing plate on a liquid crystal cell which will be described later, the second optically anisotropic layer 18*b* is disposed to be placed on the liquid crystal cell side. A liquid crystal compound Y is included in the second optically anisotropic layer 18*b*.

Re(550) and Rth(550) of the second optically anisotropic layer 18*b* satisfy the following expressions (2-3) and (2-4).

$$125\text{ nm}\leq Re(550)\leq 185\text{ nm} \quad \text{Expression (2-3)}$$

$$-95\text{ nm}\leq Rth(550)\leq -60\text{ nm} \quad \text{Expression (2-4)}$$

Within the ranges, from the viewpoint of further enhancing the effect of the present invention, Re(550) is preferably 130 nm to 180 nm, more preferably 135 nm to 175 nm, and still more preferably 140 nm to 170 nm, and Rth(550) is preferably −90 nm to −65 nm, more preferably −88 nm to −67 nm, and still more preferably −85 nm to −70 nm.

In the case of not satisfying the relationship of the expression (2-3) or (2-4), a liquid crystal display device deteriorates in terms of color display and light leakage in an oblique direction.

The thickness of the second optically anisotropic layer 18*b* is 10 μm or less. From the viewpoint of thinning of a liquid crystal display device, the thickness is preferably 6 μm or less, more preferably 4 μm or less, and still more preferably 2 μm or less. The lower limit is not particularly limited and from the viewpoint of uneven coating of the second optically anisotropic layer 18*b*, the lower limit is preferably 0.1 μm or more.

In the case in which the thickness of the second optically anisotropic layer 18*b* is more than 10 μm, the thinning of a liquid crystal display device cannot be achieved and when a liquid crystal display device is left to stand under a moist and hot environment, display unevenness easily occurs.

In addition, the definition of the liquid crystal compound Y is as described above and out of these compounds, in the second embodiment, from the viewpoint of further enhancing the effect of the present invention, the liquid crystal compound Y is preferably a discotic liquid crystal compound.

In addition, the second optically anisotropic layer 18*b* is preferably a negative A plate.

Further, the second optically anisotropic layer 18*b* is produced in the same procedure as that of the above-mentioned second optically anisotropic layer 18*a*.

From the viewpoint of further enhancing the effect of the present invention, when the surface of the first polarizer protective layer 12 is observed from a normal direction (when the surface is observed from the upper side to the lower side in FIG. 4), an angle formed between the slow axis of the second optically anisotropic layer 18*b* and the absorption axis of the first polarizer 14 is preferably 90°.

In addition, from the viewpoint of further enhancing the effect of the present invention, it is preferable that at least one of the first optically anisotropic layer 16*b* or the second optically anisotropic layer 18*b* satisfies the above-mentioned requirement (A) or (B).

In addition, the above-mentioned alignment film 20 and adhesive layer 22 may be included in the polarizing plate 10*b* as in the first embodiment.

Further, the thickness of the polarizing plate 10*b* is 100 μm or less as the thickness of the above-mentioned polarizing plate 10*a*, and a preferable embodiment thereof is also the same.

Third Embodiment

Hereinafter, a third embodiment of the polarizing plate according to the present invention will be described with reference to the drawing.

Figure 5:
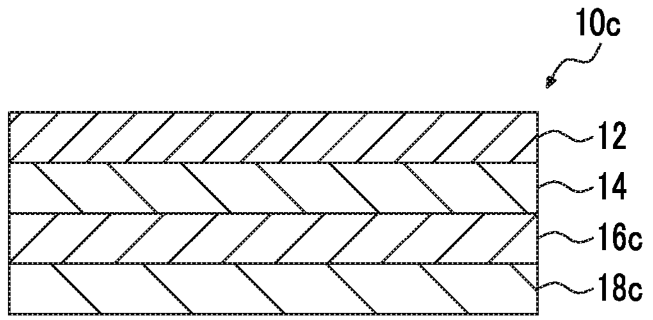
FIG. 5 is a cross-sectional view showing one embodiment of the polarizing plate according to a third embodiment of the present invention.

A polarizing plate 10*c* shown in FIG. 5 comprises a first polarizer protective layer 12, a first polarizer 14, a first optically anisotropic layer 16*c*, and a second optically anisotropic layer 18*c*.

The polarizing plate 10*c* shown in FIG. 5 has the same configuration as the configuration of the polarizing plate 10*a* shown in FIG. 1 except the first optically anisotropic layer 16*c* and the second optically anisotropic layer 18*c*. Thus, the same constitutional elements are indicated by the same reference numerals and the description thereof is omitted. The first optically anisotropic layer 16*c* and the second optically anisotropic layer 18*c* will be mainly described.

(First Optically Anisotropic Layer 16*c*)

The first optically anisotropic layer 16*c* is a layer disposed between the first polarizer 14 and the second optically anisotropic layer 18*c*, which will be described later, and includes a liquid crystal compound X.

Re(550) and Rth(550) of the first optically anisotropic layer 16*c* satisfy the following expressions (3-1) and (3-2).

$$40\ \text{nm} \le Re(550) \le 110\ \text{nm} \quad \text{Expression (3-1)}$$

$$20\ \text{nm} \le Rth(550) \le 55\ \text{nm} \quad \text{Expression (3-2)}$$

Within the ranges, from the viewpoint of further enhancing the effect of the present invention, Re(550) is preferably 45 nm to 105 nm, more preferably 55 nm to 95 nm, and still more preferably 60 nm to 90 nm, and Rth(550) is preferably 22 nm to 53 nm, more preferably 27 nm to 48 nm, and still more preferably 30 nm to 45 nm.

In the case of not satisfying the relationship of the above expression (3-1) or (3-2), a liquid crystal display device deteriorates in terms of color display and light leakage in an oblique direction.

The thickness of the first optically anisotropic layer 16*c* is 10 m or less. From the viewpoint of thinning of a liquid crystal display device, the thickness is preferably 6 μm or less, more preferably 4 μm or less, and still more preferably 2 μm or less. The lower limit is not particularly limited. However, from the viewpoint of uneven coating of the first optically anisotropic layer 16*c*, the lower limit is preferably 0.1 μm or more.

In the case in which the thickness of the first optically anisotropic layer 16*c* is more than 10 μm, thinning of a liquid crystal display device cannot be achieved and when a liquid crystal display device is left to stand under a moist and hot environment, display unevenness easily occurs.

In addition, the definition of the liquid crystal compound X is as described above and out of these compounds, in the third embodiment, from the viewpoint of further enhancing the effect of the present invention, the liquid crystal compound X is preferably a rod-like liquid crystal compound.

In addition, the first optically anisotropic layer 16*c* is preferably a positive A plate.

Further, the first optically anisotropic layer 16*c* is produced in the same procedure as that of the above-mentioned first optically anisotropic layer 16*a*.

(Second Optically Anisotropic Layer 18*c*)

The second optically anisotropic layer 18*c* is a layer disposed on the first optically anisotropic layer 16*c* and in the case in which the polarizing plate is disposed on a liquid crystal cell, which will be described later, the second optically anisotropic layer 18*c* is disposed to be placed on the liquid crystal cell side. In the second optically anisotropic layer 18*c*, a liquid crystal compound Y is included.

Re(550) and Rth(550) of the second optically anisotropic layer 18*c* satisfy the following expressions (3-3) and (3-4).

$$90\ \text{nm} \le Re(550) \le 155\ \text{nm} \quad \text{Expression (3-3)}$$

$$-80\ \text{nm} \le Rth(550) \le -45\ \text{nm} \quad \text{Expression (3-4)}$$

Within the ranges, from the viewpoint of further enhancing the effect of the present invention, Re(550) is preferably 95 nm to 150 nm, more preferably 100 nm to 145 nm, and still more preferably 105 nm to 140 nm, and Rth(550) is preferably −75 nm to −47 nm, more preferably −73 nm to −50 nm, and still more preferably −70 nm to −52 nm.

In the case of not satisfying the relationship of the above expression (3-3) or (3-4), a liquid crystal display device deteriorates in terms of color display and light leakage in an oblique direction.

The thickness of the second optically anisotropic layer 18*c* is 10 μm or less. From the viewpoint of thinning of a liquid crystal display device, the thickness is preferably 6 μm or less, more preferably 4 μm or less, and still more preferably 2 μm or less. The lower limit is not particularly limited. However, from the viewpoint of uneven coating of the second optically anisotropic layer 18*c*, the lower limit is preferably 0.1 μm or more.

In the case in which the thickness of the second optically anisotropic layer 18*c* is more than 10 μm, thinning of a liquid crystal display device cannot be achieved and when a liquid crystal display device is left to stand under a moist and hot environment, display unevenness easily occurs.

In addition, the definition of the liquid crystal compound Y is as described above and out of these compounds, in the third embodiment, from the viewpoint of further enhancing the effect of the present invention, the liquid crystal compound Y is preferably a discotic liquid crystal compound.

In addition, the second optically anisotropic layer 18*c* is preferably a negative A plate.

Further, the second optically anisotropic layer 18*c* is produced in the same procedure as that of the above-mentioned second optically anisotropic layer 18*a*.

From the viewpoint of further enhancing the effect of the present invention, when the surface of the first polarizer protective layer 12 is observed from the normal direction (when the surface is observed from the upper side to the lower side in FIG. 5), an angle formed between the slow axis of the first optically anisotropic layer 16*c* and the absorption axis of the first polarizer 14 is preferably 90°, and an angle formed between the slow axis of the second optically anisotropic layer 18*c* and the absorption axis of the first polarizer 14 is preferably 90°.

In addition, from the viewpoint of further enhancing the effect of the present invention, it is preferable that at least one of the first optically anisotropic layer 16*c* or the second optically anisotropic layer 18*c* satisfies the above-mentioned requirement (A) or (B).

In addition, the above-mentioned alignment film 20 and adhesive layer 22 may be included in the polarizing plate 10*c* as in the first embodiment.

Further, the thickness of the polarizing plate 10*c* is 100 μm or less as the thickness of the above-mentioned polarizing plate 10*a*, and a preferable embodiment thereof is also the same.

<<Liquid Crystal Display Device>>

Figure 6:
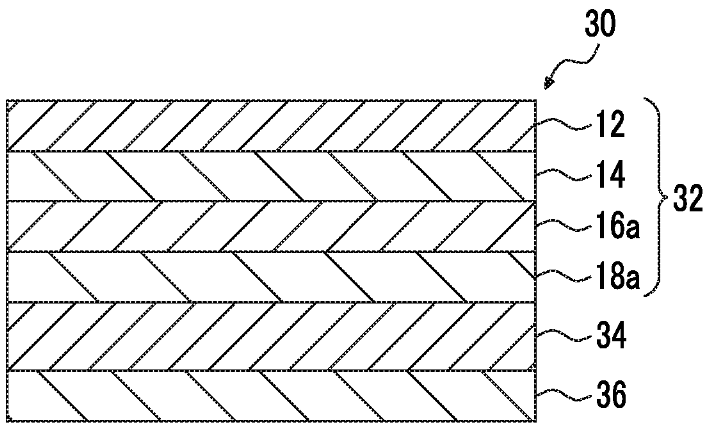
FIG. 6 is a cross-sectional view showing one embodiment of a liquid crystal display device according to the present invention.

The above-mentioned polarizing plate can be preferably used in a liquid crystal display device. FIG. 6 is a conceptual diagram showing an example of a liquid crystal display device according to the present invention. In FIG. 6, the upper side is a front side (visible side) and the lower side is a rear side.

In FIG. 6, a liquid crystal display comprises a first polarizing plate 32 including a polarizer, an IPS mode or FFS mode liquid crystal cell 34, and a second polarizing plate 36 including a polarizer from the visible side. In the embodiment shown in FIG. 6, the first polarizing plate 32 has the same configuration as the configuration of the above-mentioned polarizing plate 10*a*. That is, the first polarizing plate has a first polarizer protective layer 12, a first polarizer 14, a first optically anisotropic layer 16*a*, and a second optically anisotropic layer 18*a*. That is, in FIG. 6, the first polarizing plate 32 corresponds to the polarizing plate 10*a* in FIG. 1.

In FIG. 6, as described above, an embodiment in which the above-mentioned polarizing plate 10*a* is used as the first polarizing plate 32 is shown but the configuration is not limited to the embodiment. The polarizing plate 10*b*, which is the second embodiment of the above-mentioned polarizing plate, or the polarizing plate 10*c*, which is the third embodiment of the polarizing plate, may be used.

In addition, in FIG. 6, the polarizing plate 10*a* is used as the front side first polarizing plate 32 in the liquid crystal display device 30. However, the embodiment is not limited thereto. The polarizing plate may be used as the rear side second polarizing plate 36. Needless to say, the polarizing plate 10*b*, which is the second embodiment of the above-mentioned polarizing plate, or the polarizing plate 10*c*, which is the third embodiment of the polarizing plate, may be used as the rear side second polarizing plate 36.

Hereinafter, each member constituting the liquid crystal display device 30 will be described in detail.

(First Polarizing Plate 32)

The first polarizing plate 32 is a polarizing plate disposed on the front side (visible side) in the liquid crystal display device 30.

The first polarizing plate 32 is configured to have the polarizing plate 10*a*, which is the first embodiment of the above-mentioned polarizing plate, as described above, and the description of the configuration of the polarizing plate 10*a* will be omitted.

In the first polarizing plate 32, the second optically anisotropic layer 18*a* is disposed on the liquid crystal cell 34 side.

(Liquid Crystal Cell 34)

The liquid crystal cell 34 is an IPS mode or FFS mode liquid crystal cell which is a horizontal electric field mode.

The IPS mode liquid crystal cell is characterized in that the liquid crystal compound (particularly, a rod-like liquid crystal compound) in the liquid crystal layer is substantially horizontally aligned in the surface of the substrate when voltage is not applied and the mode is switched by changing the alignment direction of the liquid crystal compound with voltage application. Specifically, devices described in JP2004-365941A, JP2004-12731A, JP2004-215620A, JP2002-221726A, JP2002-55341A, and JP2003-195333A can be used. In the mode of these devices, the liquid crystal compound is aligned in substantially parallel at the time of black display and in a state in which voltage is not applied, the liquid crystal compound is aligned in parallel with the surface of the liquid crystal layer to achieve black display.

The FFS mode is a mode in which the alignment of the liquid crystal molecules is switched such that the liquid crystal molecules are always horizontally aligned to the surface of the liquid crystal layer, similar to the IPS mode, and the alignment of the liquid crystal molecules are switched on the surface of the liquid crystal layer in the horizontal direction by using a horizontal electric field. In general, the FFS mode has a solid electrode, an interlayer insulating film, and a comb-like electrode, and is characterized in that the electric field direction is different from the electric field direction in IPS.

A liquid crystal compound is included in the liquid crystal layer in the liquid crystal cell and typically, a rod-like liquid crystal compound is preferably included. The definition of the rod-like liquid crystal compound is as described above.

In the IPS mode or FFS mode, ideally, the liquid crystal compound in the liquid crystal layer is aligned horizontally to the surface of the liquid crystal layer at white display and black display. However, the liquid crystal compound may be aligned to be inclined at a low tilt angle. Particularly, as described later, the liquid crystal compound in the liquid crystal layer may have an average tilt angle in the same direction as the inclined direction of the liquid crystal compound Z in the third optically anisotropic layer. In general, in the case in which the glass substrate of the liquid crystal cell is rubbed with a cloth and the liquid crystal layer is aligned, the liquid crystal compound is aligned to be inclined to the substrate interface at a low tilt angle and in the case in which the liquid crystal layer is aligned by irradiating the glass substrate with ultraviolet (UV) light (photo alignment), the liquid crystal compound is aligned to be almost horizontal.

The configuration of the liquid crystal cell 34 may include at least the above liquid crystal layer and may include other members.

For example, two substrates may be disposed so as to sandwich the liquid crystal layer and a transparent electrode may be disposed on the surface of at least one of the two substrates.

In addition, the liquid crystal cell 34 may include a color filter layer and a thin film transistor (TFT) layer. From the viewpoint of further enhancing the effect of the present invention, it is preferable that at least one of a color filter layer or a TFT layer satisfies the expression (A).

$$5\ \text{nm} \leq Rth(550) \leq 30\ \text{nm} \qquad \text{Expression (A)}$$

The position of the color filter layer and the TFT layer is not particularly limited and the layers are disposed between the liquid crystal layer and the first polarizing plate 32, or between the liquid crystal layer and the second polarizing plate 36.

(Second Polarizing Plate 36)

The second polarizing plate 36 is a polarizing plate disposed on the rear side in the liquid crystal display device 30.

The configuration of the second polarizing plate 36 is not particularly limited as long as the second polarizing plate includes at least a polarizer. As the polarizer, polarizers shown as examples in the description of the above-mentioned first polarizer 14 can be used and the preferable thickness range thereof is as described above.

When the surface of the first polarizing plate 32 is observed from the normal direction, an angle formed between the absorption axis of the first polarizer 14 in the first polarizing plate 32 and the absorption axis of the polarizer in the second polarizing plate 36 is a right angle (90°).

The thickness of the second polarizing plate 36 is not particularly limited. However, from the viewpoint of thinning of the liquid crystal display device, the thickness is preferably 100 μm or less, more preferably 60 μm or less, still more preferably 40 μm or less, and even still more preferably 20 μm or less.

The second polarizing plate 36 may include a polarizer protective layer and the like other than the polarizer.

Figure 7:
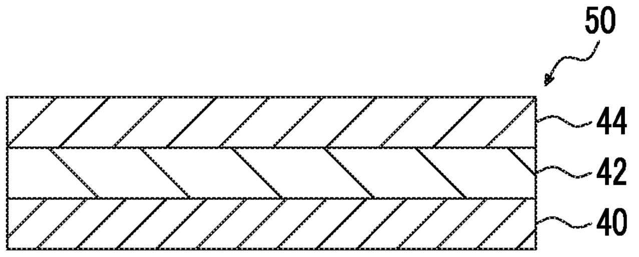
FIG. 7 is a cross-sectional view showing one embodiment of a second polarizing plate.

Among these, from the viewpoint of further enhancing the effect of the present invention, as shown in FIG. 7, a polarizing plate 50 having a second polarizer protective layer 40, a second polarizer 42, and a third optically anisotropic layer 44 including a liquid crystal compound Z is preferable. In the case in which the polarizing plate 50 is disposed in a liquid crystal display device, the third optically anisotropic layer 44 is disposed so as to be directed to the liquid crystal cell side.

Hereinafter, each member constituting the polarizing plate 50 will be described in detail.

The second polarizer protective layer 40 is provided to protect the second polarizer 42.

The type of the second polarizer protective layer 40 is not particularly limited and films shown as examples in the description of the above-mentioned first polarizer protective layer 12 can be used.

In addition, the ranges of the thickness and the moisture permeability of the second polarizer protective layer 40 are the same as the ranges of the thickness and the moisture permeability of the above-mentioned first polarizer protective layer 12.

The type of the second polarizer 42 is not particularly limited and known polarizers can be employed. For example, polarizers shown as examples in the description of the above-mentioned first polarizer 14 can be used.

The preferable thickness range of the second polarizer 42 is the same as the preferable thickness range of the above-mentioned first polarizer 14.

The third optically anisotropic layer 44 is a layer disposed on the second polarizer 42 and includes a liquid crystal compound Z.

When the surface of the third optically anisotropic layer 44 is observed from the normal direction, the slow axis of the third optically anisotropic layer 44 is parallel with the slow axis of the liquid crystal layer in the liquid crystal cell 34 in a state in which voltage is not applied.

The third optically anisotropic layer 44 can be produced in the same procedure as that of the above-mentioned first optically anisotropic layer **16*a*** and the like.

From the viewpoint of further enhancing the effect of the present invention, it is preferable that the liquid crystal compound Z in the third optically anisotropic layer 44 has an average tilt angle in the same direction as the average inclined direction of the liquid crystal compound in the liquid crystal layer in the liquid crystal cell 34 to the surface of the liquid crystal layer. The term "the same direction" includes an error allowable within the range not departing from the scope of the present invention in addition to completely the same direction. Specifically, the error is preferably within a range of the exact angle ±5° and more preferably within a range of the exact angle ±20.

The type of the liquid crystal compound Z is not particularly limited and liquid crystal compounds shown as examples in the description of the above-mentioned liquid crystal compound X can be used. Among these, from the viewpoint of further enhancing the effect of the present invention, it is preferable that the liquid crystal compound Z is a rod-like liquid crystal compound. Particularly, from the viewpoint of achieving an alignment with a high degree of order, a liquid crystal compound showing a smectic phase is preferable.

As means for controlling the average tilt angle of the liquid crystal compound Z, there are a method of preliminarily tilting a rubbed alignment film, and a method of controlling the polar angle on the surface side of the third optically anisotropic layer 44 through the addition of a tilt angle controlling agent to the third optically anisotropic layer 44, and these methods are preferably used in combination.

The tilt angle controlling agent is composed of, for example, a copolymer of a monomer containing a fluoroaliphatic group preferably with an condensed aromatic functional group or with a monomer including a carboxyl group, a sulfo group, a phosphonoxy group, or a salt thereof. The use of plural tilt angle controlling agents enables fine and stable control of the tilt angle. Such tilt angle controlling agents are disclosed in paragraphs "0022" to "0063" of JP2008-257205A and paragraphs "0017" to "0124" of JP2006-91732A.

In addition, the average tilt angle of the liquid crystal compound Z is not particularly limited. However, from the viewpoint of further enhancing the effect of the present invention, the average tilt angle is preferably 1° to 20°, more preferably 1° to 10°, and still more preferably 2° to 8°. The tilt angle of the liquid crystal compound Z is a tilt angle with respect to the surface of the third optically anisotropic layer 44.

In the third optically anisotropic layer 44, there may be a difference in the tilt angle of the liquid crystal compound Z between one surface and the other surface.

The thickness of the third optically anisotropic layer 44 is preferably 10 μm or less. From the viewpoint of thinning of the liquid crystal display device, the thickness is preferably 6 μm or less, more preferably 4 μm or less, and still more preferably 2 μm or less. The lower limit is not particularly limited. However, from the viewpoint of uneven coating of the third optically anisotropic layer 44, the lower limit is preferably 0.1 μm or more.

It is preferable that Re(550) of the third optically anisotropic layer 44 satisfies the following expression (4-1).

$$10\ \text{nm} \leq Re(550) \leq 120\ \text{nm} \qquad \text{Expression (4-1)}$$

Within the range, from the viewpoint of further enhancing the effect of the present invention, Re(550) is preferably 20 nm to 110 nm and more preferably 30 nm to 100 nm.

It is preferable that the third optically anisotropic layer 44 satisfies the following expression (1).

$$0.83 \leq Re(450)/Re(550) \leq 1.1 \qquad \text{Expression (I)}$$

(Re(550) represents an in-plane retardation at a wavelength of 550 nm and Re(450) represents an in-plane retardation at a wavelength of 450 nm)

In FIG. 7, the second polarizer 42 is in direct contact with the third optically anisotropic layer 44 but the above-mentioned alignment film 20 and adhesive layer 22 may be provided between the second polarizer and the third optically anisotropic layer.

EXAMPLES

Hereinafter, the present invention will be more specifically described referring to examples. In the following Examples, materials, used amounts, ratios, the details of treatments, and the treatment procedures may be suitably modified within the range not departing from the scope of the present invention. Therefore, it is to be understood that the scope of the present invention should not be interpreted in a limited manner based on the specific examples shown below.

Example A

Example 1

<Preparation of Protective Layer>

The following composition was put into a mixing tank and was stirred to dissolve each component. Thus, a core layer cellulose acylate dope 1 was prepared.

| | |
|---|---|
| Cellulose acetate (acetyl substitution degree: 2.88) | 100 parts by mass |
| Ester oligomer (Compound 1-1) | 10 parts by mass |
| Durability improver (Compound 1-2) | 4 parts by mass |
| Ultraviolet absorbent (Compound 1-3) | 3 parts by mass |
| Methylene chloride (first solvent) | 438 parts by mass |
| Methanol (second solvent) | 65 parts by mass |

(Compound 1-1)

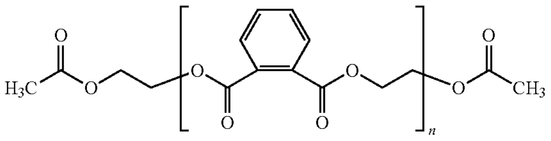

Molecular weight 1,000

(Compound 1-2)

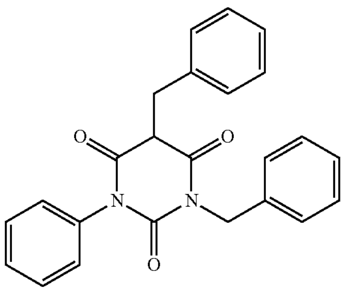

-continued (Compound 1-3)

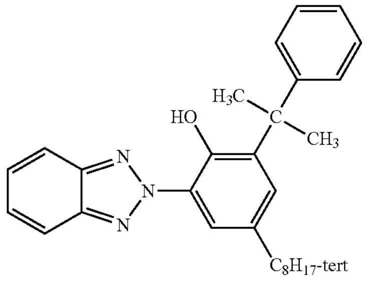

[Preparation of Outer Layer Cellulose Acylate Dope 1]

10 parts by mass of a matting agent dispersion liquid 1 having the following composition was added to the core layer cellulose acylate dope 1 (90 parts by mass) and thus an outer layer cellulose acylate dope 1 was prepared.

| | |
|---|---|
| Silica particles having an average particle size of 20 nm (AEROSIL R972 manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope 1 | 1 part by mass |

[Preparation of Cellulose Acylate Film]

Three layers of the core layer cellulose acylate dope 1 and the outer layer cellulose acylate dope 1 on both sides thereof were cast on the drum at 20° C. from casting ports at the same time. In a state in which the content of the solvent was about 20% by mass, the film was peeled off and the both ends of the film in the width direction were fixed by a tenter clip. In a state in which the amount of the residual solvent was 3% by mass to 15% by mass, the film was dried while being stretched in the horizontal direction by 1.2 times. Thereafter, the stretched film was conveyed between rolls in a heat treatment device to prepare a cellulose acylate film having a film thickness of 25 μm. Thus, a polarizing plate protective layer 01 was formed.

[Measurement of Moisture Permeability]

The moisture permeability of the polarizing plate protective layer was measured according to a method defined in a moisture permeability test method (cup method) of JIS Z-0208 for moisture-proof wrapping material (40° C., 90% RH). The moisture permeability of the polarizing plate protective layer 01 was 980 $g/m^2$-day.

<Preparation of Hard Coat Layer>

As a coating solution for forming a hard coat layer, the curable composition for hard coating (hard coating 1) shown in Table below was prepared.

| | Monomer | | | | UV initiator | | |
|---|---|---|---|---|---|---|---|
| | Monomer 1 | Monomer 2 | Monomer 1/ Monomer 2 | Total amount of addition [parts by mass] | Type | Amount of addition [parts by mass] | Solvent |
| Hard coating 1 | Pentaerythritol triacrylate | Pentaerythritol tetraacrylate | 3/2 | 53.5 | UV initiator 1 | 1.5 | Ethyl acetate |

(Compound 2-1)

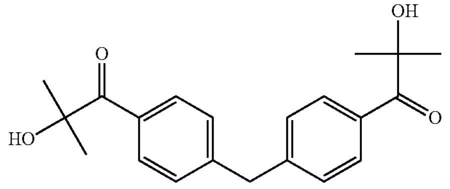

UV initiator 1

The hard coating 1 was applied to the surface of the polarizing plate protective layer 01 prepared above and then dried at 100° C. for 60 seconds. The coating film was cured by irradiation with UV (1.5 kW, 300 mJ) under the condition of a nitrogen content of 0.1% or less to prepare a protective layer 01 with a hard coat layer having a hard coat layer having a thickness of 5 μm. The film thickness of the hard coat layer was adjusted by adjusting the coating amount in a die coating method by using a slot die.

<Preparation of Polarizing Plate 01 with Protective Layer on One Surface>

1) Saponification of Film

The prepared protective layer 01 with a hard coat layer was immersed in 4.5 mol/L of an aqueous sodium hydroxide solution (saponification solution) whose temperature was adjusted to 37° C. for 1 minute and then the film was washed with water. Thereafter, the film was immersed in 0.05 mol/L of an aqueous sulfuric acid solution for 30 seconds and then further led to pass through a water bath. Then, dewatering using an air knife was repeated three times. After water was removed, the film was left to stay in a drying zone at 70° C. for 15 seconds for drying. Thus, a saponified protective layer 01 with a hard coat layer was prepared.

2) Preparation of Polarizer

According to Example 1 in JP2001-141926A, the film was stretched in the longitudinal direction between two pairs of nip rolls running at a different peripheral speed, and thereby a polarizer having a width of 1,330 mm and a thickness of 15 μm was prepared. The polarizer prepared in this manner was used as a polarizer 1.

3) Lamination

The saponified protective layer 01 with a hard coat layer was laminated on the polarizer 1 obtained as described above using an aqueous 3% PVA solution (PVA-117H manufactured by Kuraray Co., Ltd) as an adhesive in a roll-to-roll process in such a manner that the polarizing axis and the longitudinal direction of the film were arranged to be perpendicular to each other and thus a polarizing plate 01 with a protective layer on one surface (hereinafter, simply referred to as a polarizing plate 01) was prepared.

At this time, the cellulose acylate film side of the protective layer was laminated so as to be placed on the polarizer side.

<Preparation 2 of Polarizing Plate 02 with Protective Layer on One Surface>

A polarizing plate 02 (hereinafter, also simply referred to as a polarizing plate 02) was prepared in the same manner as in the preparation of the polarizing plate 01 except that a hard coat layer was not provided on the surface of the polarizing plate protective layer 01. In the following Examples and Comparative Examples, unless otherwise specified, the polarizing plate 01 was disposed on the visible side and the polarizing plate 02 was disposed on the backlight side to prepare each liquid crystal display device. A polarizing plate disposed on the visible side is referred to as the visible side polarizing plate and a polarizing plate disposed on the backlight side is referred to as a backlight side polarizing plate.

<Formation of First Optically Anisotropic Layer>

The polarizer side surface of the polarizing plate 01 was rubbed in the direction perpendicular to the absorption axis of the polarizer. The following coating solution A for an optically anisotropic layer was applied to the rubbed surface using a #2.4 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the rod-like liquid crystal compound was horizontally aligned and the direction of the slow axis was parallel with the rubbing direction, that is, the direction of the slow axis was perpendicular to the direction of the absorption axis of the polarizer. The light incident angle dependency of Re and Rth was measured with an automatic birefringence meter (KOBRA-21ADH manufactured by Oji Scientific Instruments Co., Ltd.). Re was 128 nm and Rth was 64 nm at a wavelength of 550 nm.

| Composition of Coating Solution A for Optically Anisotropic Layer | |
|---|---|
| Rod-like liquid crystal compound 1 | 80 parts by mass |
| Rod-like liquid crystal compound 2 | 20 parts by mass |
| Photopolymerization initiator 1 (IRGACURE 907 manufactured by BASF) | 3.0 parts by mass |
| Sensitizer (KAYACURE-DETX manufactured by Nippon Kayaku Co., Ltd.) | 1.0 part by mass |
| Fluorinated compound A | 0.8 parts by mass |
| Methyl ethyl ketone | 213 parts by mass |

Rod-like liquid crystal compound 1

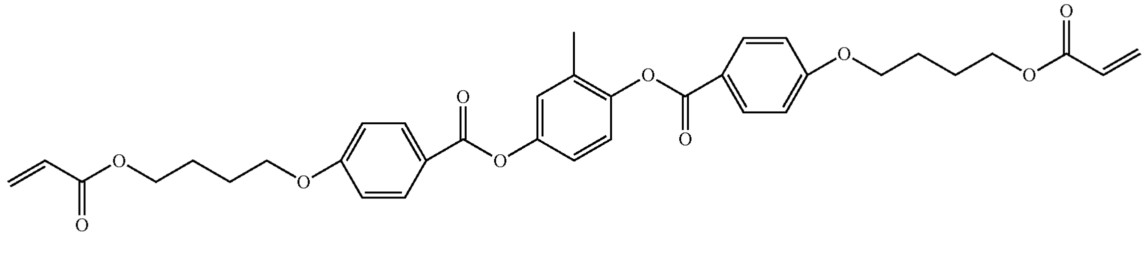

-continued

Rod-like liquid crystal compound 2

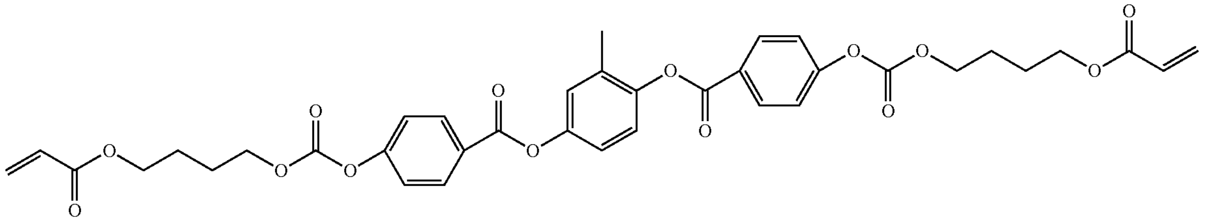

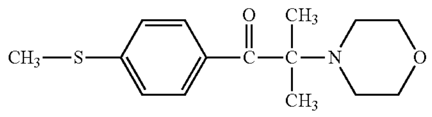

Photopolymerization initiator 1

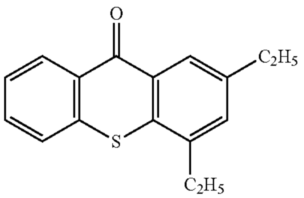

Sensitizer

Flourinated compound A

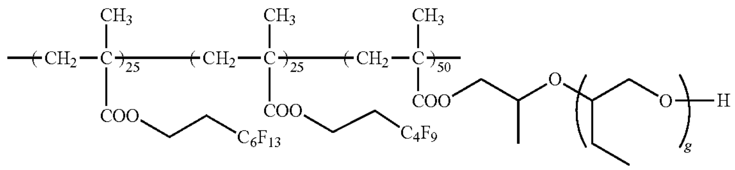

<Formation of Alignment Film>

An alignment film coating solution having the following composition was applied to the surface of the first optically anisotropic layer prepared above using a #14 wire bar. The applied solution was dried with warm air at 60° C. for 120 seconds and thus an alignment film was formed.

| Composition of Alignment Film Coating solution | |
|---|---|
| Modified polyvinyl alcohol shown below | 10 parts by mass |
| Water | 245 parts by mass |
| Methanol | 245 parts by mass |
| Glutaraldehyde | 0.5 parts by mass |

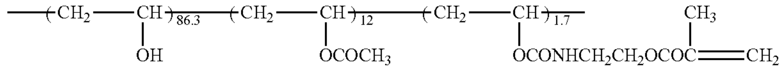

Modified polyvinyl alcohol

<Preparation of Second Optically Anisotropic Layer>

The coating solution B for an optically anisotropic layer below was applied to the alignment film using a #2.4 bar coater. Next, the applied solution was heated and aged at film surface temperature of 60° C. for 30 seconds and irradiated with ultraviolet rays with an irradiation dose of 290 $mJ/cm^2$ at a film surface temperature of 60° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the rod-like liquid crystal compound was vertically aligned. The light incident angle dependency of Re and Rth was measured with an automatic birefringence meter (KOBRA-21ADH manufactured by Oji Scientific Instruments Co., Ltd.). Re was 0 nm and Rth was −115 nm at a wavelength of 550 nm.

| Composition of Coating Solution B for Optically Anisotropic Layer | |
|---|---|
| Rod-like liquid crystal compound 1 | 80 parts by mass |
| Rod-like liquid crystal compound 2 | 20 parts by mass |

-continued

| Composition of Coating Solution B for Optically Anisotropic Layer | |
|---|---|
| Photopolymerization initiator 1 (IRGACURE 907 manufactured by BASF) | 3.0 parts by mass |
| Sensitizer (KAYACURE-DETX manufactured by Nippon Kayaku Co., Ltd.) | 1.0 part by mass |
| Fluorinated compound B | 0.8 parts by mass |

-continued

| Composition of Coating Solution B for Optically Anisotropic Layer | |
|---|---|
| Vertical aligning agent 1 | 1.0 part by mass |
| Adhesion improver 1 | 0.25 parts by mass |
| Methyl ethyl ketone | 251 parts by mass |

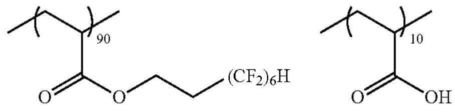

Fluorinated compound B

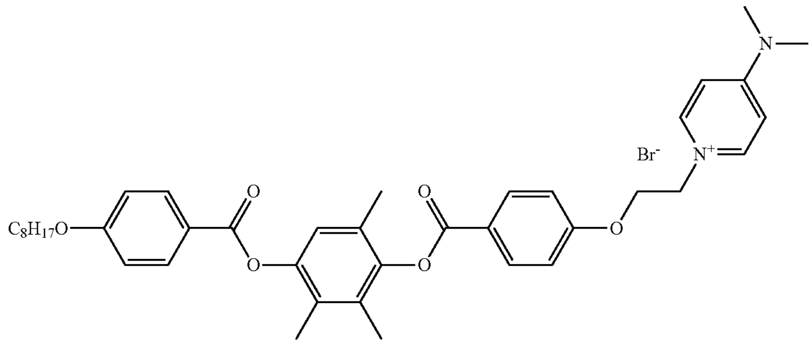

Vertical aligning agent 1

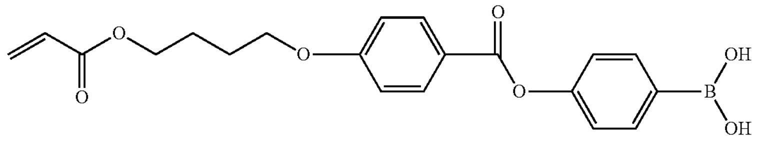

Adhesion improver 1

<Preparation of Liquid Crystal Display Device>

Polarizing plates were peeled off from the front and rear sides of a commercially available liquid crystal display device (iPad manufactured by Apple Inc.) (a liquid crystal display device including a FFS mode liquid crystal cell) and the polarizing plate 01 having the first optically anisotropic layer and the second optically anisotropic layer prepared above was laminated on the polarizing plate 02 such that the absorption axes of the polarizers included in the respective polarizing plates were arranged to be perpendicular to each other. Thus, a liquid crystal display device of Example 1 was prepared. The liquid crystal cell in the liquid crystal display device included a color filter layer and a TFT layer and Rth(550) of each layer was 14 nm and 16 nm, respectively.

<Evaluation of Liquid Crystal Display Device>

(Evaluation of Oblique Light Leakage and Tint)

<Oblique Light Leakage>

The black brightness of the liquid crystal display device at black display was measured in a dark room using a measurement machine (EZ-Contrast XL88 manufactured by ELDIM). The average value of luminance at a polar angle of 60° and azimuthal angles of 45°, 135°, 225°, and 315° was set to light leakage Y and the light leakage was evaluated according to the following criteria. With respect to the absorption axis of the polarizing plate, unless otherwise specified, the visible side is disposed at an azimuthal angle of 0° and backlight side is disposed at an azimuthal angle of 90°.

A: Y<0.6 (cd/$m^2$)

B: 0.6 (cd/$m^2$)≤Y<0.8 (cd/$m^2$)

C: 0.8 (cd/$m^2$)≤Y

<Oblique Color Variation>

The chromaticity of the liquid crystal display device at black display was measured in a dark room using a measurement machine (EZ-Contrast XL88 manufactured by ELDIM). Specifically, chromaticity values of u' and v' at a polar angle of 60° and an azimuthal angle of 0° to 345° in 15° increment were calculated and the minimum value and maximum value of u' and v' (u'min, v'min), (u'max, v'max) were extracted. The color variation Δu'v' was evaluated by the following expression.

$$\Delta u'v' = \sqrt{((u'\text{max} - u'\text{min})^2 + (v'\text{max} - v'\text{min})^2)}$$

AA: Δu'v'<0.15

A: 0.15≤Δu'v'<0.18

B: 0.18≤Δu'v'<0.2

C: 0.2≤Δu'v'

(Evaluation of Display Unevenness)

The prepared liquid crystal display device was subjected to a thermo treatment at 50° C. and a relative humidity of 80% for 72 hours and then the backlight of the liquid crystal display device was turned on at 25° C. and a relative humidity of 60%. By imaging a black display screen from the front side of the screen using a luminance measuring camera "PROMETRIC" (manufactured by Radiant Imaging), the light leakage at four corners of the panel after 10 had passed from the lighting was evaluated based on the average luminance of the entire screen and a luminance difference of a portion where the light leakage at the four corners was large.

[Evaluation Criteria of Display Unevenness]

AA: No light leakage was observed at the four corners of the panel (the light leakage of the panel was approximately the same as the state before the thermo treatment).

A: Almost no light leakage was observed at the four corners of the panel.

B: Slight amount of light leakage was observed at one or two of the four corners of the panel, which was allowable.

C: Slight amount of light leakage was observed at three or four of the four corners of the panel, which was allowable.
D: Large amount of light leakage was observed at the four corners of the panel, which was not allowable.

Example 2

<Formation of First Optically Anisotropic Layer>

A first optically anisotropic layer was formed in the same manner as in Example 1 except that the amount of methyl ethyl ketone used in the coating solution A for an optically anisotropic layer was changed to 252 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the bar coater was changed to a #2.0 bar coater, and the amount of methyl ethyl ketone used in the coating solution B for an optically anisotropic layer was changed to 243 parts by mass, and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Example 3

<Formation of First Optically Anisotropic Layer>

A first optically anisotropic layer was formed in the same manner as in Example 1 except that the amount of methyl ethyl ketone used in the coating solution A for an optically anisotropic layer was changed to 196 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the amount of methyl ethyl ketone used in the coating solution B for an optically anisotropic layer was changed to 233 parts by mass, and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Example 4

<Formation of First Optically Anisotropic Layer>

A first optically anisotropic layer was formed in the same manner as in Example 1 except that the bar coater was changed to a #2.0 bar coater, and the amount of methyl ethyl ketone used in the coating solution A for an optically anisotropic layer was changed to 221 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the bar coater was changed to a #2.0 bar coater, and the amount of methyl ethyl ketone used in the coating solution B for an optically anisotropic layer was changed to 278 parts by mass and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Example 5

<Formation of First Optically Anisotropic Layer>

A first optically anisotropic layer was formed in the same manner as in Example 1 except that the bar coater was changed to a #3.0 bar coater, and the amount of methyl ethyl ketone used in the coating solution A for an optically anisotropic layer was changed to 243 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the amount of methyl ethyl ketone used in the coating solution B for an optically anisotropic layer was changed to 220 parts by mass and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Comparative Example 1

<Formation of First Optically Anisotropic Layer>

A first optically anisotropic layer was formed in the same manner as in Example 1 except that the bar coater was changed to a #2.0 bar coater, and the amount of methyl ethyl ketone used in the coating solution A for an optically anisotropic layer was changed to 259 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the bar coater was changed to a #2.0 bar coater, and the amount of methyl ethyl ketone used in the coating solution B for an optically anisotropic layer was changed to 356 parts by mass and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Comparative Example 2

<Formation of First Optically Anisotropic Layer>

A first optically anisotropic layer was formed in the same manner as in Example 1 except that the bar coater was changed to a #3.0 bar coater, and the amount of methyl ethyl ketone used in the coating solution A for an optically anisotropic layer was changed to 219 parts by mass. The properties of the prepared first optically anisotropic layer are shown in Table 1.

<Formation of Second Optically Anisotropic Layer and Preparation of Polarizing Plate>

A second optically anisotropic layer was formed in the same manner as in Example 1 except that the amount of methyl ethyl ketone used in the coating solution B for an optically anisotropic layer was changed to 196 parts by mass and thereby a polarizing plate was prepared. The properties of the prepared second optically anisotropic layer are shown in Table 1.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

Comparative Example 3

<Preparation of Protective Layer>

The following composition was put into a mixing tank and was stirred while being heated to dissolve the respective components. Thus, a cellulose acetate solution (dope) was prepared.

| [Composition of Cellulose Acetate Solution (Dope)] | |
|---|---|
| Cellulose acetate (acetyl substitution degree: 2.86, viscosity-average polymerization degree: 310) | 100 parts by mass |
| Triphenyl phosphate | 8.0 parts by mass |
| Biphenyl diphenyl phosphate | 4.0 parts by mass |
| TINUVIN 328 manufactured by Ciba Japan, K.K. | 1.0 part by mass |
| TINUVIN 326 manufactured by Ciba Japan, K.K. | 0.2 parts by mass |
| Methylene chloride | 369 parts by mass |
| Methanol | 80 parts by mass |
| 1-Butanol | 4 parts by mass |

The obtained dope was heated to 30° C. and cast on a mirror surface stainless support, which is a drum having a diameter of 3 m, through a casting basis. The surface temperature of support was set to −5° C. The spatial temperature of the entire casting portion was set to 15° C. In addition, after peeling the cellulose ester film which was obtained by rotating by casting from the drum immediately before 50 cm from the ending portion of the casting portion, the both ends were clipped with the pin tenter. The amount of residual solvent of the cellulose ester web immediately after peeling was 70%, and film temperature of the cellulose ester web was 5° C.

The cellulose ester web held by the pin tenter was conveyed to the drying zone. At the beginning of drying, dry air was blown at 45° C. Next, drying was performed at 110° C. for 5 minutes and then at 140° C. for 10 minutes.

The thickness of the obtained film was 80 μm. The film was used as a polarizing plate protective layer X.

[Measurement of Moisture Permeability]

The moisture permeability of the polarizing plate protective layer was measured according to a method defined in a moisture permeability test method (cup method) of JIS Z 0208 for moisture-proof wrapping material (40° C., 90% RH). The moisture permeability of the polarizing plate protective layer X was 400 g/m$^2$·day.

A polarizing plate X with a protective layer on one surface was prepared in the same procedure as the preparation of the polarizing plate 01 with a protective layer on one surface in Example 1 except that the polarizing plate protective layer X obtained above was used instead of the polarizing plate protective layer 01.

In addition, referring to the procedure in <Preparation of Polarizing Plate 01 with Protective Layer on One Surface> implemented in Example 1, a backlight side polarizing plate X in which the polarizer 1 was sandwiched between the polarizing plate protective layers X was prepared.

<Preparation of Optically Anisotropic Layer>

Based on the descriptions of paragraphs “0101” to “0109” of Example 1 in JP4253259B, a laminate including a first optically anisotropic layer and a second optically anisotropic layer was prepared. The cellulose acetate film 1 of Example 1 in JP4253259B corresponds to the first optically anisotropic layer and the optical compensation film 1 corresponds to the second optically anisotropic layer.

<Preparation of Polarizing Plate>

The laminate was lamented on the polarizer side surface of the polarizing plate X with a protective layer on one surface using an aqueous 3% PVA solution (PVA-117H manufactured by Kuraray Co., Ltd) as an adhesive in a roll-to-roll process in such a manner that the absorption axis of the polarizer and the slow axis of the second optically anisotropic layer were arranged to be perpendicular to each other and thereby a polarizing plate was prepared.

<Preparation of Liquid Crystal Display Device>

A liquid crystal display device was prepared and evaluated in the same manner as in Example 1 except that the polarizing plate prepared above was used as the visible side polarizing plate and the backlight side polarizing plate X was used instead of the polarizing plate 02. The evaluation results are shown in Table 1. The third optically anisotropic layer corresponds to the polarizing plate protective layer X in Table 1.

Comparative Example 4

<Formation of First Optically Anisotropic Layer>

The polarizer side surface of the polarizing plate 01 was rubbed in the direction perpendicular to the absorption axis of the polarizer. A coating solution whose concentration was adjusted such that the amount of methyl ethyl ketone used in a coating solution D for an optically anisotropic layer, which will be described later, was adjusted to 240 parts by mass was applied to the rubbed surface using a #3.2 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the discotic liquid crystal compound was vertically aligned and the direction of the slow axis was perpendicular to the rubbing direction, that is, the direction of the slow axis was parallel with the direction of the absorption axis of the polarizer. The light incident angle dependency of Re and Rth was measured with an automatic birefringence meter (KOBRA-21ADH manufactured by Oji Scientific Instruments Co., Ltd.). Re was 132 nm and Rth was −66 nm at a wavelength of 550 nm.

<Formation of Alignment Film>

The alignment film coating solution was continuously applied to the surface of the first optically anisotropic layer prepared above using a #14 wire bar. The applied solution was dried with warm air at 60° C. for 120 seconds and thus an alignment film was formed.

<Preparation of Second Optically Anisotropic Layer>

A coating solution whose concentration was adjusted such that the amount of methyl ethyl ketone used in a coating solution C for an optically anisotropic layer, which will be described later, was adjusted to 280 parts by mass was applied to the alignment film using a #2.0 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was horizontally aligned. The light incident angle dependency of Re and Rth was measured with an automatic birefringence meter (KOBRA-21ADH manufactured by Oji Scientific Instruments Co., Ltd.). Re was 0 nm and Rth was 80 nm at a wavelength of 550 nm.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 1.

In Table 1, "Re/Rth" represents values of Re(550) and Rth(550), respectively.

In addition, in Table 1, "Wavelength dispersion" represents Re(450)/Re(550) in the case in which Re(550) of each optically anisotropic layer is more than 10 nm and represents (R[40°, 450])/(R[40°, 550]) in the case in which Re(550) of each optically anisotropic layer is 10 nm or less.

Further, in Examples 1 to 5 below, when the surface of the first polarizer protective layer was observed from the normal direction, an angle formed between the slow axis of the first optically anisotropic layer and the absorption axis of the first polarizer was 90°.

In Table 1, the thickness of each of the first optically anisotropic layer, the second optically anisotropic layer, and the third optically anisotropic layer is shown.

The thickness of the visible side polarizing plate in Table 1 refers to the total thickness value of the first polarizer protective layer, the first polarizer, the first optically anisotropic layer, and the second optically anisotropic layer.

The thickness of the backlight side polarizing plate in Table 1 refers to the total thickness value of the second polarizer protective layer and the second polarizer. However, in the case in which the third optically anisotropic layer is present, the thickness of the backlight side polarizing plate refers to the total thickness value of the second polarizer protective layer, the second polarizer, and the third optically anisotropic layer.

The thickness of the polarizing plate obtained in each Example was 100 μm or less.

TABLE 1

| | | | Example 1 | Example 2 | Example 3 | Example 4 | Example 5 |
|---|---|---|---|---|---|---|---|
| Visible side polarizing plate | First polarizer protective layer | Thickness [μm] | 25 | 25 | 25 | 25 | 25 |
| | | Moisture permeability [g/m$^2$ · day] | 980 | 980 | 980 | 980 | 980 |
| | First polarizer | Thickness [μm] | 15 | 15 | 15 | 15 | 15 |
| | First optically anisotropic layer | Re/Rth [nm/nm] | 128/64 | 114/57 | 135/68 | 104/52 | 146/73 |
| | | Wavelength dispersion | 1.09 | 1.09 | 1.09 | 1.09 | 1.09 |
| | | Thickness [μm] | 1.05 | 0.94 | 1.11 | 0.85 | 1.20 |
| | Second optically anisotropic layer | Re/Rth [nm/nm] | 0/−115 | 0/−98 | 0/−121 | 0/−89 | 1/−126 |
| | | Wavelength dispersion | 1.09 | 1.09 | 1.09 | 1.09 | 1.09 |
| | | Thickness [μm] | 0.95 | 0.81 | 1.00 | 0.73 | 1.04 |
| Backlight side polarizing plate | Third optically anisotropic layer | Re/Rth [nm/nm] | — | — | — | — | — |
| | | Average tilt angle [°] | — | — | — | — | — |
| | | Wavelength dispersion | — | — | — | — | — |
| | | Thickness [μm] | — | — | — | — | — |
| | Second polarizer | Thickness [μm] | 15 | 15 | 15 | 15 | 15 |
| | Second polarizer protective layer | Thickness [μm] | 25 | 25 | 25 | 25 | 25 |
| | | Moisture permeability [g/m$^2$ · day] | 980 | 980 | 980 | 980 | 980 |

TABLE 1-continued

| | | | | | | | |
|---|---|---|---|---|---|---|---|
| Thickness of visible side polarizing plate [μm] | | | 42 | 41.75 | 42.11 | 41.58 | 42.24 |
| Thickness of backlight side polarizing plate [μm] | | | 40 | 40 | 40 | 40 | 40 |
| Evaluation item | Display performance | Oblique light leakage | A | A | A | B | B |
| | | Oblique color variation | A | A | A | B | B |
| | Durability evaluation | Display unevenness | A | A | A | A | A |

| | | | Comparative Example 1 | Comparative Example 2 | Comparative Example 3 | Comparative Example 4 |
|---|---|---|---|---|---|---|
| Visible side polarizing plate | First polarizer protective layer | Thickness [μm] | 25 | 25 | 80 | 25 |
| | | Moisture permeability [g/m$^2$ · day] | 980 | 980 | 400 | 980 |
| | First polarizer | Thickness [μm] | 15 | 15 | 15 | 15 |
| | First optically anisotropic layer | Re/Rth [nm/nm] | 93/47 | 157/79 | 8/82 | 132/−66 |
| | | Wavelength dispersion | 1.09 | 1.09 | 0.95 | 1.09 |
| | | Thickness [μm] | 0.76 | 1.29 | 80 | 1.37 |
| | Second optically anisotropic layer | Re/Rth [nm/nm] | 0/−74 | 0/−136 | 130/−65 | 0/80 |
| | | Wavelength dispersion | 1.09 | 1.09 | 1.15 | 1.09 |
| | | Thickness [μm] | 0.61 | 1.12 | 2 | 0.72 |
| Backlight side polarizing plate | Third optically anisotropic layer | Re/Rth [nm/nm] | — | — | 3/45 | — |
| | | Average tilt angle [°] | — | — | — | — |
| | | Wavelength dispersion | — | — | 0.94 | — |
| | | Thickness [μm] | — | — | 80 | — |
| | Second polarizer | Thickness [μm] | 15 | 15 | 15 | 15 |
| | Second polarizer protective layer | Thickness [μm] | 25 | 25 | 80 | 25 |
| | | Moisture permeability [g/m$^2$ · day] | 980 | 980 | 400 | 980 |
| Thickness of visible side polarizing plate [μm] | | | 41.37 | 42.41 | 177 | 42.09 |
| Thickness of backlight side polarizing plate [μm] | | | 40 | 40 | 175 | 40 |
| Evaluation item | Display performance | Oblique light leakage | C | C | B | B |
| | | Oblique color variation | B | C | C | C |
| | Durability evaluation | Display unevenness | A | A | C | A |

As shown in Table 1, the liquid crystal display devices in which the polarizing plate of the first embodiment according to the present invention was used exhibited excellent display performance. Further, after the durability test, display unevenness did not occur.

On the other hand, in Comparative Examples 1 to 4 in which the polarizing plate in which predetermined Re(550) or Rth(550) of the first optically anisotropic layer or the second optically anisotropic layer was out of the range was used, various performance deteriorated compared to Examples.

Example B

Example 6

<Preparation of First Optically Anisotropic Layer>

The following coating solution C for an optically anisotropic layer was applied to the polarizer side surface of the polarizing plate 01 using a #2.0 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the discotic liquid crystal compound was horizontally aligned. The light incident angle dependency of Re and Rth was measured with an automatic birefringence meter (KOBRA-21ADH manufactured by Oji Scientific Instruments Co., Ltd.). Re was 0 nm and Rth was 75 nm at a wavelength of 550 nm.

| Composition of Coating Solution C for Optically Anisotropic Layer | |
|---|---|
| Discotic liquid crystal compound 1 | 72 parts by mass |
| Discotic liquid crystal compound 2 | 18 parts by mass |
| Polymerizable compound | 10 parts by mass |
| Photopolymerization initiator 2 (IRGACURE 184 manufactured by BASF) | 3.0 parts by mass |
| Fluorinated compound C | 0.8 parts by mass |
| Adhesion improver 2 | 0.5 parts by mass |
| Methyl ethyl ketone | 303 parts by mass |

Discotic liquid crystal compound 1
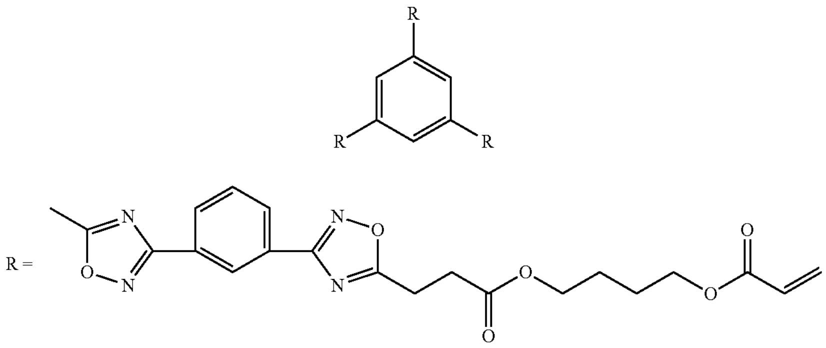
Discotic liquid crystal compound 2
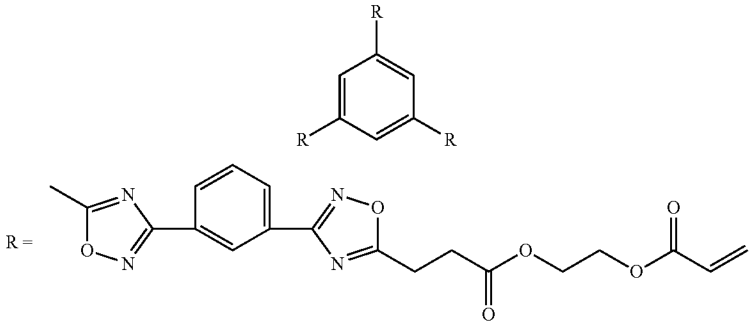
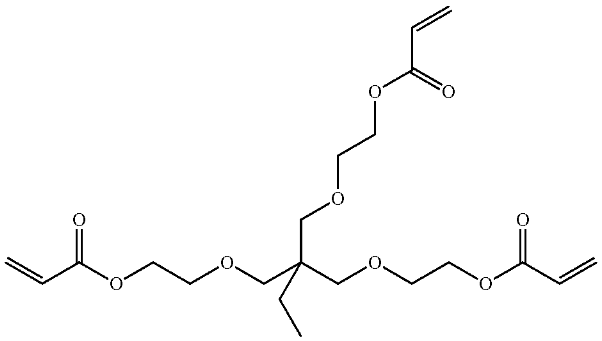
Polymerizable compound
Fluorinated compound C
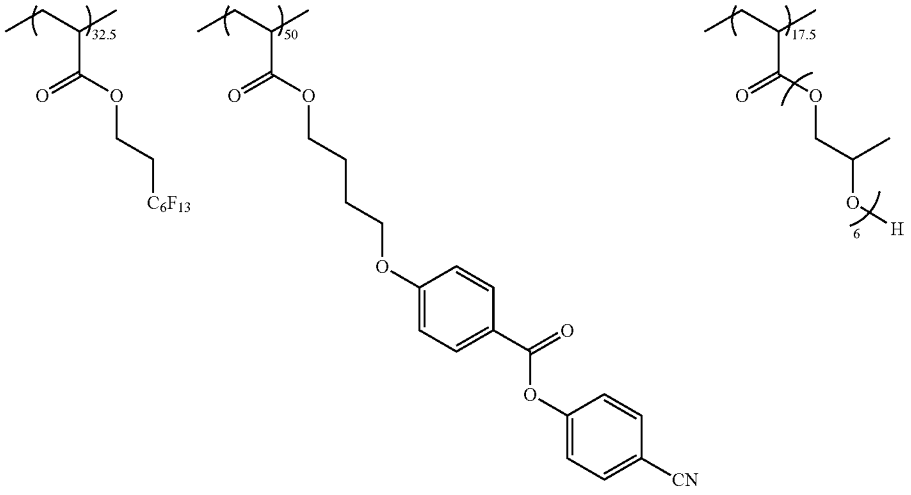

-continued

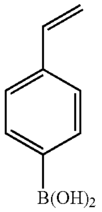

Adhesion improver 2

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and thus an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

The following coating solution D for an optically anisotropic layer was applied to the rubbed alignment film using a #4.4 bar coater. Next, the applied solution was heated and aged at a film surface temperature of 70° c. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was vertically aligned and the direction of the slow axis was perpendicular to the rubbing direction, that is, the direction of the slow axis was perpendicular to the absorption axis of the polarizer. The light incident angle dependency of Re and Rth was measured with an automatic birefringence meter (KOBRA-21ADH manufactured by Oji Scientific Instruments Co., Ltd.). Re was 158 nm and Rth was −79 nm at a wavelength of 550 nm.

| Composition of Coating Solution D for Optically Anisotropic Layer | |
|---|---|
| Discotic liquid crystal compound 1 | 80 parts by mass |
| Discotic liquid crystal compound 2 | 20 parts by mass |
| Polymerizable compound | 10 parts by mass |
| Photopolymerization initiator 1 (IRGACURE 907 manufactured by BASF) | 3.0 parts by mass |
| Fluorinated compound D | 0.6 parts by mass |
| Fluorinated compound E | 0.01 part by mass |
| Vertical aligning agent 2 | 0.9 parts by mass |
| Vertical aligning agent 3 | 0.08 parts by mass |
| Methyl ethyl ketone | 293 parts by mass |

Fluorinated compound D

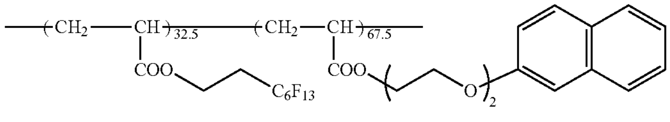

Fluorinated compound E

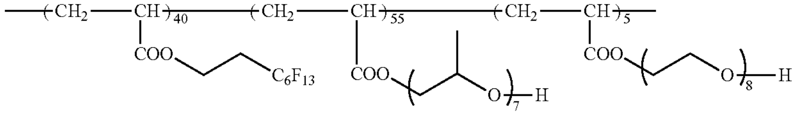

Vertical aligning agent 2

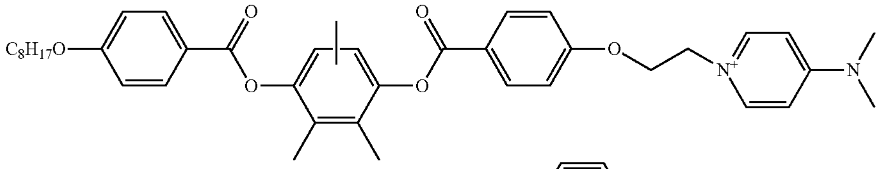

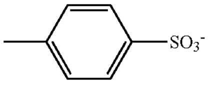

PTS

-continued

Vertical aligning agent 3

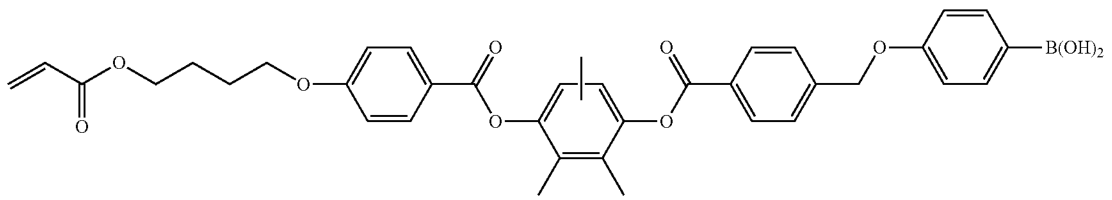

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Example 7

<Formation of First Optically Anisotropic Layer>

A first optically anisotropic layer was prepared in the same manner as in Example 6 except that the amount of methyl ethyl ketone used in the coating solution C for an optically anisotropic layer was changed to 387 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the bar coater was changed to a #3.2 bar coater and the amount of methyl ethyl ketone used in the coating solution D for an optically anisotropic layer was changed to 206 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Example 8

<Formation of First Optically Anisotropic Layer>

A first optically anisotropic layer was prepared in the same manner as in Example 6 except that the bar coater was changed to a #3.0 bar coater and the amount of methyl ethyl ketone used in the coating solution C for an optically anisotropic layer was changed to 362 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the amount of methyl ethyl ketone used in the coating solution D for an optically anisotropic layer was changed to 273 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Example 9

<Formation of First Optically Anisotropic Layer>

A first optically anisotropic layer was prepared in the same manner as in Example 6 except that the amount of methyl ethyl ketone used in the coating solution C for an optically anisotropic layer was changed to 502 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the bar coater was changed to a #3.2 bar coater and the amount of methyl ethyl ketone used in the coating solution D for an optically anisotropic layer was changed to 240 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Example 10

<Formation of First Optically Anisotropic Layer>

A first optically anisotropic layer was prepared in the same manner as in Example 6 except that the bar coater was changed to a #3.0 bar coater and the amount of methyl ethyl ketone used in the coating solution C for an optically anisotropic layer was changed to 315 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the amount of methyl ethyl ketone used in the coating solution D for an optically anisotropic layer was changed to 249 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Comparative Example 5

<Formation of First Optically Anisotropic Layer>

A first optically anisotropic layer was prepared in the same manner as in Example 6 except that the amount of methyl ethyl ketone used in the coating solution C for an optically anisotropic layer was changed to 620 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the bar coater was changed to a #3.2 bar coater and the amount of methyl ethyl ketone used in the coating solution D for an optically anisotropic layer was changed to 272 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Comparative Example 6

<Formation of First Optically Anisotropic Layer>

A first optically anisotropic layer was prepared in the same manner as in Example 6 except that the bar coater was changed to a #3.0 bar coater and the amount of methyl ethyl ketone used in the coating solution C for an optically anisotropic layer was changed to 286 parts by mass. The properties of the prepared first optically anisotropic layer are shown in Table 2.

<Formation of Second Optically Anisotropic Layer and Preparation of Polarizing Plate>

A second optically anisotropic layer was formed in the same manner as in Example 6 except that the amount of methyl ethyl ketone used in the coating solution D for an optically anisotropic layer was changed to 231 parts by mass and thereby a polarizing plate was prepared. The properties of the prepared second optically anisotropic layer are shown in Table 2.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

Comparative Example 7

<Preparation of First Optically Anisotropic Layer>

A coating solution whose concentration was adjusted such that the amount of methyl ethyl ketone used in the coating solution B for an optically anisotropic layer was adjusted to 274 parts by mass was applied to the polarizer side surface of the polarizing plate 01 using a #2.0 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the rod-like liquid crystal compound was vertically aligned. The light incident angle dependency of Re and Rth was measured with an automatic birefringence meter (KOBRA-21ADH manufactured by Oji Scientific Instruments Co., Ltd.). Re was 0 nm and Rth was −90 am at a wavelength of 550 nm.

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

A coating solution whose concentration was adjusted such that the amount of methyl ethyl ketone used in the coating solution A for an optically anisotropic layer was adjusted to 228 parts by mass was applied to the alignment film using a #2.4 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the rod-like liquid crystal compound was horizontally aligned and the direction of the slow axis was parallel with the rubbing direction, that is, the direction of the slow axis was parallel with the direction of the absorption axis of the polarizer. The light incident angle dependency of Re and Rth was measured with an automatic birefringence meter (KOBRA-21ADH manufactured by Oji Scientific Instruments Co., Ltd.). Re was 122 nm and Rth was 61 nm at a wavelength of 550 nm.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 2.

In Table 2, "Re/Rth" represents values of Re(550) and Rth(550), respectively.

In addition, in Table 2, "Wavelength dispersion" represents Re(450)/Re(550) in the case in which Re(550) of each optically anisotropic layer is more than 10 nm and represents (R[40°, 450])/(R[40°, 550]) in the case in which Re(550) of each optically anisotropic layer is 10 nm or less.

Further, in Examples 6 to 10, when the surface of the first polarizer protective layer was observed from the normal direction, an angle formed between the slow axis of the second optically anisotropic layer and the absorption axis of the first polarizer was 90°.

In Table 2, the thickness of each of the first optically anisotropic layer and the second optically anisotropic layer is shown.

The thickness of the visible side polarizing plate in Table 2 refers to the total thickness value of the first polarizer protective layer, the first polarizer, the first optically anisotropic layer, and the second optically anisotropic layer.

The thickness of the backlight side polarizing plate in Table 2 refers to the total thickness value of the second polarizer protective layer and the second polarizer.

The thickness of the polarizing plate obtained in each Example was 100 μm or less.

solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the rod-like liquid crystal compound was horizontally aligned and the direction of the slow axis was parallel with the rubbing direction, that is, the direction of the slow axis was perpendicular to the direction of the absorption axis of the polarizer. The light incident angle dependency of Re and Rth was measured with an automatic birefringence meter

TABLE 2

| | | | Example 6 | Example 7 | Example 8 | Example 9 | Example 10 | Comparative Example 5 | Comparative Example 6 | Comparative Example 7 |
|---|---|---|---|---|---|---|---|---|---|---|
| Visible side polarizing plate | First polarizer protective layer | Thickness [μm] | 25 | 25 | 25 | 25 | 25 | 25 | 25 | 25 |
| | | Moisture permeability [g/m$^2$ · day] | 980 | 980 | 980 | 980 | 980 | 980 | 980 | 980 |
| | First polarizer | Thickness [μm] | 15 | 15 | 15 | 15 | 15 | 15 | 15 | 15 |
| | First optically anisotropic layer | Re/Rth [nm/nm] | 0/75 | 0/61 | 0/97 | 0/48 | 1/109 | 0/39 | 0/118 | 0/−90 |
| | | Wavelength dispersion | 1.09 | 1.09 | 1.09 | 1.09 | 1.09 | 1.09 | 1.09 | 1.09 |
| | | Thickness [μm] | 0.68 | 0.56 | 0.89 | 0.46 | 0.99 | 0.38 | 1.06 | 0.74 |
| | Second optically anisotropic layer | Re/Rth [nm/nm] | 158/−79 | 146/−73 | 166/−83 | 132/−66 | 177/−89 | 121/61 | 186/93 | 122/61 |
| | | Wavelength dispersion | 1.09 | 1.09 | 1.09 | 1.09 | 1.09 | 1.09 | 1.09 | 1.09 |
| | | Thickness [μm] | 1.64 | 1.52 | 1.73 | 1.37 | 1.84 | 1.26 | 1.93 | 1.00 |
| Backlight side polarizing plate | Second polarizer | Thickness [μm] | 15 | 15 | 15 | 15 | 15 | 15 | 15 | 15 |
| | Second polarizer protective layer | Thickness [μm] | 25 | 25 | 25 | 25 | 25 | 25 | 25 | 25 |
| | | Moisture permeability [g/m$^2$ · day] | 980 | 980 | 980 | 980 | 980 | 980 | 980 | 980 |
| Thickness of visible side polarizing plate [μm] | | | 42.32 | 42.08 | 42.62 | 41.83 | 42.83 | 41.64 | 42.99 | 41.74 |
| Thickness of backlight side polarizing plate [μm] | | | 40 | 40 | 40 | 40 | 40 | 40 | 40 | 40 |
| Evaluation item | Display performance | Oblique light leakage | A | A | A | B | B | C | C | B |
| | | Oblique color variation | A | A | A | B | B | B | C | C |
| | Durability evaluation | Display unevenness | A | A | A | A | A | A | A | A |

As shown in Table 2, the liquid crystal display devices in which the polarizing plate of the second embodiment of the present invention was used exhibited excellent display performance. Further, after the durability test, display unevenness did not occur.

On the other hand, in Comparative Examples 5 to 7 in which the polarizing plate in which predetermined Re(550) or Rth(550) of the first optically anisotropic layer or the second optically anisotropic layer was out of the range was used, various performance deteriorated compared to Examples.

Example C

Example 11

<Preparation of First Optically Anisotropic Layer>

The polarizer side surface of the polarizing plate 01 was rubbed in the direction perpendicular to the absorption axis of the polarizer. A coating solution whose concentration was adjusted such that the amount of methyl ethyl ketone used in the coating solution A for an optically anisotropic layer was adjusted to 347 parts by mass was prepared and applied to the rubbed surface using a #2.0 bar coater. Next, the applied (KOBRA-21ADH manufactured by Oji Scientific Instruments Co., Ltd.). Re was 75 nm and Rth was 38 nm at a wavelength of 550 rm.

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and thus an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

A coating solution whose concentration was adjusted such that the amount of methyl ethyl ketone used in the coating solution D for an optically anisotropic layer was adjusted to 260 parts by mass was applied to the alignment film using a #3.2 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was vertically aligned and the direction of the slow axis was perpendicular to the rubbing direction, that is, the direction of the slow axis was perpendicular to the direction of the absorption axis of the polarizer. The light incident angle dependency of Re and Rth was measured with an automatic birefringence meter (KOBRA-21ADH manufactured by Oji Scientific Instruments Co., Ltd.). Re was 125 nm and Rth was −63 nm at a wavelength of 550 nm.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Example 12

<Formation of First Optically Anisotropic Layer>

A first optically anisotropic layer was formed in the same manner as in Example 11 except that the amount of methyl ethyl ketone used in the coating solution A for an optically anisotropic layer was changed to 408 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the bar coater was changed to a #2.8 bar coater and the amount of methyl ethyl ketone used in the coating solution D for an optically anisotropic layer was changed to 254 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Example 13

<Formation of First Optically Anisotropic Layer>

A first optically anisotropic layer was formed in the same manner as in Example 11 except that the amount of methyl ethyl ketone used in the coating solution A for an optically anisotropic layer was changed to 289 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the amount of methyl ethyl ketone used in the coating solution D for an optically anisotropic layer was changed to 235 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Example 14

<Formation of First Optically Anisotropic Layer>

A first optically anisotropic layer was formed in the same manner as in Example 11 except that the amount of methyl ethyl ketone used in the coating solution A for an optically anisotropic layer was changed to 522 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the bar coater was changed to a #2.8 bar coater and the amount of methyl ethyl ketone used in the coating solution D for an optically anisotropic layer was changed to 287 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Example 15

<Formation of First Optically Anisotropic Layer>

A first optically anisotropic layer was formed in the same manner as in Example 11 except that the amount of methyl ethyl ketone used in the coating solution A for an optically anisotropic layer was changed to 248 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the amount of methyl ethyl ketone used in the coating solution D for an optically anisotropic layer was changed to 215 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Comparative Example 8

<Formation of First Optically Anisotropic Layer>

A first optically anisotropic layer was formed in the same manner as in Example 11 except that the bar coater was changed to a #1.6 bar coater and the amount of methyl ethyl ketone used in the coating solution A for an optically anisotropic layer was changed to 474 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the bar coater was changed to a #2.8 bar coater and the amount of methyl ethyl ketone used in the coating solution D for an optically anisotropic layer was changed to 346 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Comparative Example 9

<Formation of First Optically Anisotropic Layer>

A first optically anisotropic layer was formed in the same manner as in Example 11 except that the bar coater was changed to a #2.4 bar coater and the amount of methyl ethyl ketone used in the coating solution A for an optically anisotropic layer was changed to 258 parts by mass. The properties of the prepared first optically anisotropic layer are shown in Table 3.

<Formation of Second Optically Anisotropic Layer and Preparation of Polarizing Plate>

A second optically anisotropic layer was formed in the same manner as in Example 11 except that the bar coater was changed to a #4.4 bar coater and the amount of methyl ethyl ketone used in the coating solution D for an optically anisotropic layer was changed to 298 parts by mass, and thereby a polarizing plate was prepared. The properties of the prepared second optically anisotropic layer are shown in Table 3.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

Comparative Example 10

<Formation of First Optically Anisotropic Layer>

The polarizer side surface of the polarizing plate 01 was rubbed in the direction perpendicular to the direction of the absorption axis of the polarizer. A coating solution whose concentration was adjusted such that the amount of methyl ethyl ketone used in the coating solution D for an optically anisotropic layer was adjusted to 341 parts by mass was applied to the rubbed surface using a #2.8 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the discotic liquid crystal compound was vertically aligned and the direction of the slow axis was perpendicular to the rubbing direction, that is, the direction of the slow axis was perpendicular to the direction of the absorption axis of the polarizer. The light incident angle dependency of Re and Rth was measured with an automatic birefringence meter (KOBRA-21ADH manufactured by Oji Scientific Instruments Co., Ltd.). Re was 90 nm and Rth was −45 nm at a wavelength of 550 nm.

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and thus an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

A coating solution whose concentration was adjusted such that the amount of methyl ethyl ketone used in the coating solution A for an optically anisotropic layer was adjusted to 318 parts by mass was applied to the alignment film using a #2.0 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the rod-like liquid crystal compound was horizontally aligned and the direction of the slow axis was parallel with the rubbing direction, that is, the direction of the slow axis was parallel with the direction of the absorption axis of the polarizer. The light incident angle dependency of Re and Rth was measured with an automatic birefringence meter (KOBRA-21ADH manufactured by Oji Scientific Instruments Co., Ltd.). Re was 80 nm and Rth was 40 nm at a wavelength of 550 nm.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 3.

In Table 3, "Re/Rth" represents values of Re(550) and Rth(550), respectively.

In addition, in Table 3, "Wavelength dispersion" represents Re(450)/Re(550) in the case in which Re(550) of each optically anisotropic layer is more than 10 nm and represents (R[40°, 450])/(R[40°, 550]) in the case in which Re(550) of each optically anisotropic layer is 10 nm or less.

Further, in Examples 11 to 15, when the surface of the first polarizer protective layer was observed from the normal direction, an angle formed between the slow axis of the first optically anisotropic layer and the absorption axis of the first polarizer was 90° and an angle formed between the slow axis of the second optically anisotropic layer and the absorption axis of the first polarizer was 90°.

In Table 3, the thickness of each of the first optically anisotropic layer and the second optically anisotropic layer is shown.

The thickness of the visible side polarizing plate in Table 3 refers to the total thickness value of the first polarizer protective layer, the first polarizer, the first optically anisotropic layer, and the second optically anisotropic layer.

The thickness of the backlight side polarizing plate in Table 3 refers to the total thickness value of the second polarizer protective layer and the second polarizer.

The thickness of the polarizing plate obtained in each Example was 100 μm or less.

TABLE 3

| | | | Example 11 | Example 12 | Example 13 | Example 14 | Example 15 | Comparative Example 8 | Comparative Example 9 | Comparative Example 10 |
|---|---|---|---|---|---|---|---|---|---|---|
| Visible side polarizing plate | First polarizer protective layer | Thickness [μm] | 25 | 25 | 25 | 25 | 25 | 25 | 25 | 25 |
| | | Moisture permeability [g/m$^2$ · day] | 980 | 980 | 980 | 980 | 980 | 980 | 980 | 980 |
| | First polarizer | Thickness [μm] | 15 | 15 | 15 | 15 | 15 | 15 | 15 | 15 |
| | First optically anisotropic layer | Re/Rth [nm/nm] | 75/38 | 66/33 | 86/43 | 54/27 | 96/48 | 39/20 | 112/56 | 90/−45 |
| | | Wavelength dispersion | 1.09 | 1.09 | 1.09 | 1.09 | 1.09 | 1.09 | 1.09 | 1.09 |
| | | Thickness [μm] | 0.62 | 0.54 | 0.71 | 0.44 | 0.79 | 0.38 | 0.92 | 0.94 |
| | Second optically anisotropic layer | Re/Rth [nm/nm] | 125/−63 | 111/−56 | 134/−67 | 102/−51 | 142/−71 | 89/45 | 156/78 | 80/40 |
| | | Wavelength dispersion | 1.09 | 1.09 | 1.09 | 1.09 | 1.09 | 1.09 | 1.09 | 1.09 |
| | | Thickness [μm] | 1.3 | 1.15 | 1.39 | 1.06 | 1.48 | 0.93 | 1.62 | 0.66 |
| Backlight side polarizing plate | Second polarizer | Thickness [μm] | 15 | 15 | 15 | 15 | 15 | 15 | 15 | 15 |
| | Second polarizer protective layer | Thickness [μm] | 25 | 25 | 25 | 25 | 25 | 25 | 25 | 25 |
| | | Moisture permeability [g/m$^2$ · day] | 980 | 980 | 980 | 980 | 980 | 980 | 980 | 980 |
| Thickness of visible side polarizing plate [μm] | | | 41.92 | 41.69 | 42.1 | 41.5 | 42.27 | 41.31 | 42.54 | 41.6 |
| Thickness of backlight side polarizing plate [μm] | | | 40 | 40 | 40 | 40 | 40 | 40 | 40 | 40 |
| Evaluation item | Display performance | Oblique light leakage | A | A | A | B | B | C | C | B |
| | | Oblique color variation | A | A | A | B | B | B | C | C |
| | Durability evaluation | Display unevenness | A | A | A | A | A | A | A | A |

As shown in Table 3, the liquid crystal display devices in which the polarizing plate of the third embodiment according to the present invention was used exhibited excellent display performance. Further, after the durability test, display unevenness did not occur.

On the other hand, in Comparative Examples 8 to 10 in which the polarizing plate in which predetermined Re(550) or Rth(550) of the first optically anisotropic layer or the second optically anisotropic layer was out of the range was used, various performance deteriorated compared to Examples.

Example D

Example 16

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 and a visible side polarizing plate was prepared.

<Formation of Third Optically Anisotropic Layer and Preparation of Polarizing Plate>

The polarizer side surface of the polarizing plate 02 was rubbed in the direction parallel with the absorption axis of the polarizer. The following coating solution G for an optically anisotropic layer was applied to the rubbed surface using a #2.0 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a third optically anisotropic layer was formed. In the formed third optically anisotropic layer, the rod-like liquid crystal compound was slightly inclined and the direction of the slow axis was parallel with the rubbing direction, that is, the direction of the slow axis was parallel with the direction of the absorption axis of the polarizer. The light incident angle dependency of Re was measured with an automatic birefringence meter (KOBRA-21ADH manufactured by Oji Scientific Instruments Co., Ltd.). Re was 35 nm at a wavelength of 550 nm and the tilt angle (average tilt angle) was 8 degrees.

| Composition of Coating Solution G for Optically Anisotropic Layer | |
|---|---|
| Rod-like liquid crystal compound 1 | 90 parts by mass |
| Rod-like liquid crystal compound 2 | 10 parts by mass |
| Photopolymerization initiator (IRGACURE 907 manufactured by Ciba Specialty Chemicals Inc.) | 3.0 parts by mass |
| Sensitizer (KAYACURE-DETX manufactured by Nippon Kayaku Co., Ltd.) | 1.0 part by mass |
| Fluorinated compound B | 0.4 parts by mass |
| Fluorinated compound D | 0.5 parts by mass |
| Methyl ethyl ketone | 660 parts by mass |

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 17

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 and thereby a polarizing plate was prepared.

<Formation of Third Optically Anisotropic Layer and Preparation of Polarizing Plate>

A third optically anisotropic layer was formed in the same manner as in Example 16 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 18

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 and thereby a polarizing plate was prepared.

<Formation of Third Optically Anisotropic Layer and Preparation of Polarizing Plate>

A third optically anisotropic layer was formed in the same manner as in Example 16 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 19

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 and thereby a polarizing plate was prepared.

<Formation of Third Optically Anisotropic Layer and Preparation of Polarizing Plate>

A third optically anisotropic layer was formed in the same manner as in Example 16 except that the amount of the fluorinated compound B used was changed to 0.2 parts by mass and the amount of methyl ethyl ketone used was changed to 431 parts by mass in the above coating solution G for an optically anisotropic layer. In the formed third optically anisotropic layer, the rod-like liquid crystal compound was slightly inclined and the direction of the slow axis was parallel with the rubbing direction, that is, the direction of the slow axis was parallel with the direction of the absorption axis of the polarizer. The light incident angle dependency of Re was measured with an automatic birefringence meter (KOBRA-21ADH manufactured by Oji Scientific Instruments Co., Ltd.). Re was 50 nm at a wavelength of 550 nm and the tilt angle was 3 degrees.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 20

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 and thereby a polarizing plate was prepared.

<Formation of Third Optically Anisotropic Layer and Preparation of Polarizing Plate>

A third optically anisotropic layer was formed in the same manner as in Example 19 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 21

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 and thereby a polarizing plate was prepared.

<Formation of Third Optically Anisotropic Layer and Preparation of Polarizing Plate>

A third optically anisotropic layer was formed in the same manner as in Example 19 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 22

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 and thereby a polarizing plate was prepared.

<Formation of Third Optically Anisotropic Layer and Preparation of Polarizing Plate>

A third optically anisotropic layer was formed in the same manner as in Example 16 except that the amount of the fluorinated compound B used was changed to 0.1 part by mass and the amount of methyl ethyl ketone used was changed to 193 parts by mass in the above coating solution G for an optically anisotropic layer. In the formed third optically anisotropic layer, the rod-like liquid crystal compound was slightly inclined and the direction of the slow axis was parallel with the rubbing direction, that is, the direction of the slow axis was parallel with the direction of the absorption axis of the polarizer. The light incident angle dependency of Re was measured with an automatic birefringence meter (KOBRA-21ADH manufactured by Oji Scientific Instruments Co., Ltd.). Re was 90 nm at a wavelength of 550 nm and the tilt angle was 2 degrees.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 23

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 and thereby a polarizing plate was prepared.

<Formation of Third Optically Anisotropic Layer and Preparation of Polarizing Plate>

A third optically anisotropic layer was formed in the same manner as in Example 22 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

Example 24

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 and thereby a polarizing plate was prepared.

<Formation of Third Optically Anisotropic Layer and Preparation of Polarizing Plate>

A third optically anisotropic layer was formed in the same manner as in Example 22 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate having the third optically anisotropic layer prepared above was used as the backlight side polarizing plate. The evaluation results are shown in Table 4.

In Table 4, "Re/Rth" represents values of Re(550) and Rth(550), respectively.

In addition, in Table 4, "Wavelength dispersion" represents Re(450)/Re(550) in the case in which Re(550) of each optically anisotropic layer is more than 10 nm and represents (R[40°, 450])/(R[40°, 550]) in the case in which Re(550) of each optically anisotropic layer is 10 nm or less.

Moreover, the slow axis of the third optically anisotropic layer was parallel with the slow axis of the liquid crystal layer in the liquid crystal cell in a state in which voltage was not applied.

Further, in Examples 16 to 24, the liquid crystal compound in the third optically anisotropic layer had an average tilt angle in the same direction as the average tilt direction of the liquid crystal compound in the liquid crystal layer with respect to the surface of the liquid crystal layer in the liquid crystal display device.

In Table 4, the thickness of each of the first optically anisotropic layer, the second optically anisotropic layer, and the third optically anisotropic layer is shown.

The thickness of the visible side polarizing plate in Table 4 refers to the total thickness value of the first polarizer protective layer, the first polarizer, the first optically anisotropic layer, and the second optically anisotropic layer.

The thickness of the backlight side polarizing plate in Table 4 refers to the total thickness value of the second polarizer protective layer, the second polarizer, and the third optically anisotropic layer.

The thickness of the polarizing plate obtained in each Example was 100 μm or less.

TABLE 4

| | | | Example 16 | Example 17 | Example 18 | Example 19 | Example 20 |
|---|---|---|---|---|---|---|---|
| Visible side polarizing plate | First polarizer protective layer | Thickness [μm] | 25 | 25 | 25 | 25 | 25 |
| | | Moisture permeability [g/m$^2$ · day] | 980 | 980 | 980 | 980 | 980 |
| | First polarizer | Thickness [μm] | 15 | 15 | 15 | 15 | 15 |
| | First optically anisotropic layer | Re/Rth [nm/nm] | 128/64 | 0/75 | 75/38 | 128/64 | 0/75 |
| | | Wavelength dispersion | 1.09 | 1.09 | 1.09 | 1.09 | 1.09 |
| | | Thickness [μm] | 1.05 | 0.68 | 0.62 | 1.05 | 0.68 |

TABLE 4-continued

| | | | | | | | |
|---|---|---|---|---|---|---|---|
| | Second optically anisotropic layer | Re/Rth [nm/nm] | 0/−115 | 158/−79 | 125/−63 | 0/−115 | 158/−79 |
| | | Wavelength dispersion | 1.09 | 1.09 | 1.09 | 1.09 | 1.09 |
| | | Thickness [μm] | 0.95 | 1.64 | 1.3 | 0.95 | 1.64 |
| Backlight side polarizing plate | Third optically anisotropic layer | Re [nm] | 35 | 35 | 35 | 50 | 50 |
| | | Average tilt angle [°] | 8 | 8 | 8 | 3 | 3 |
| | | Wavelength dispersion | 1.09 | 1.09 | 1.09 | 1.09 | 1.09 |
| | | Thickness [μm] | 0.36 | 0.36 | 0.36 | 0.52 | 0.52 |
| | Second polarizer | Thickness [μm] | 15 | 15 | 15 | 15 | 15 |
| | Second polarizer protective layer | Thickness [μm] | 25 | 25 | 25 | 25 | 25 |
| | | Moisture permeability [g/m$^2$ · day] | 980 | 980 | 980 | 980 | 980 |
| Thickness of visible side polarizing plate [μm] | | | 42 | 42.32 | 41.92 | 42 | 42.32 |
| Thickness of backlight side polarizing plate [μm] | | | 40.36 | 40.36 | 40.36 | 40.52 | 40.52 |
| Evaluation item | Display performance | Oblique light leakage | A | A | A | A | A |
| | | Oblique color variation | AA | AA | AA | AA | AA |
| | Durability evaluation | Display unevenness | A | A | A | A | A |

| | | | Example 21 | Example 22 | Example 23 | Example 24 |
|---|---|---|---|---|---|---|
| Visible side polarizing plate | First polarizer protective layer | Thickness [μm] | 25 | 25 | 25 | 25 |
| | | Moisture permeability [g/m$^2$ · day] | 980 | 980 | 980 | 980 |
| | First polarizer | Thickness [μm] | 15 | 15 | 15 | 15 |
| | First optically anisotropic layer | Re/Rth [nm/nm] | 75/38 | 128/64 | 0/75 | 75/38 |
| | | Wavelength dispersion | 1.09 | 1.09 | 1.09 | 1.09 |
| | | Thickness [μm] | 0.62 | 1.05 | 0.68 | 0.62 |
| | Second optically anisotropic layer | Re/Rth [nm/nm] | 125/−63 | 0/−115 | 158/−79 | 125/−63 |
| | | Wavelength dispersion | 1.09 | 1.09 | 1.09 | 1.09 |
| | | Thickness [μm] | 1.3 | 0.95 | 1.64 | 1.3 |
| Backlight side polarizing plate | Third optically anisotropic layer | Re [nm] | 50 | 90 | 90 | 90 |
| | | Average tilt angle [°] | 3 | 2 | 2 | 2 |
| | | Wavelength dispersion | 1.09 | 1.09 | 1.09 | 1.09 |
| | | Thickness [μm] | 0.52 | 0.94 | 0.94 | 0.94 |
| | Second polarizer | Thickness [μm] | 15 | 15 | 15 | 15 |
| | Second polarizer protective layer | Thickness [μm] | 25 | 25 | 25 | 25 |
| | | Moisture permeability [g/m$^2$ · day] | 980 | 980 | 980 | 980 |
| Thickness of visible side polarizing plate [μm] | | | 41.92 | 42 | 42.32 | 41.92 |
| Thickness of backlight side polarizing plate [μm] | | | 40.52 | 40.94 | 40.94 | 40.94 |
| Evaluation item | Display performance | Oblique light leakage | A | A | A | A |
| | | Oblique color variation | AA | AA | AA | AA |
| | Durability evaluation | Display unevenness | A | A | A | A |

As shown in Table 4, in the case of using the backlight side polarizing plate (rear side polarizing plate), it was confirmed that more excellent display performance was exhibited.

Example E

Example 25

A first optically anisotropic layer and a second optically anisotropic layer were formed in the same manner as in Example 1 except that the alignment film coating solution used in Example 1 was continuously applied to the polarizer side surface of the polarizing plate 01 using a #14 wire bar and the applied solution was dried with warm air at 60° C. for 120 seconds to form an alignment film, and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used. The evaluation results are shown in Table 5.

Example 26

A first optically anisotropic layer and a second optically anisotropic layer were formed in the same manner as in Example 6 except that the alignment film coating solution used in Example 1 was continuously applied to the polarizer side surface of the polarizing plate 01 using a #14 wire bar and the applied solution was dried with warm air at 60° C. for 120 seconds to form an alignment film, and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used. The evaluation results are shown in Table 5.

Example 27

A first optically anisotropic layer and a second optically anisotropic layer were formed in the same manner as in Example 11 except that the alignment film coating solution used in Example 1 was continuously applied to the polarizer side surface of the polarizing plate 01 using a #14 wire bar and the applied solution was dried with warm air at 60° C. for 120 seconds to form an alignment film, and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used. The evaluation results are shown in Table 5.

Example 28

<Preparation of Temporary Substrate>

Z-TAC (manufactured by Fujifilm Corporation) was used as a temporary substrate.

<Formation of Alignment Film>

An alignment film coating solution Y having the following composition was directly applied to the surface of the temporary substrate prepared above using a #14 wire bar without a saponification treatment. The applied solution was dried with warm air at 60° C. for 120 seconds and thus an alignment film was formed.

| Composition of Alignment Film Coating solution Y | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

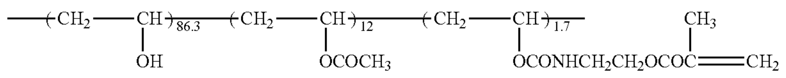

Modified polyvinyl alcohol

<Preparation of First Optically Anisotropic Layer>

The temporary substrate on which the alignment film was formed without saponification was rubbed in the direction perpendicular to the longitudinal direction of the film. The coating solution A for an optically anisotropic layer was applied to the rubbed surface using a #2.4 bar coater. Next, the applied solution was heated and aged at a film surface temperature of 60° C. for 30 seconds and irradiated with ultraviolet rays with an irradiation dose of 290 mJ/$cm^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer for transfer was formed. In the formed first optically anisotropic layer, the rod-like liquid crystal compound was horizontally aligned and the direction of the slow axis was parallel with the rubbing direction, that is, the direction of the slow axis was perpendicular to the direction of the longitudinal direction of the film. The light incident angle dependency of Re and Rth was measured with an automatic birefringence meter (KOBRA-21ADH manufactured by Oji Scientific Instruments Co., Ltd.). Re was 128 nm and Rth was 64 nm at a wavelength of 550 nm.

<Preparation of Second Optically Anisotropic Layer>

The coating solution B for an optically anisotropic layer was applied to the temporary substrate on which the alignment film was formed without saponification using a #2.4 bar coater. Next, the applied solution was heated and aged at a film surface temperature of 60° C. for 30 seconds and irradiated with ultraviolet rays with an irradiation dose of 290 mJ/$cm^2$ at a film surface temperature of 60° C. under air using an air-cooled metal halide lamp (manufactured by Eye Graphics Co., Ltd.) to fix the alignment state immediately after the heating and aging. Through these procedures, a second optically anisotropic layer for transfer was formed. In the formed second optically anisotropic layer, the rod-like liquid crystal compound was vertically aligned. The light incident angle dependency of Re and Rth was measured with an automatic birefringence meter (KOBRA-21ADH manufactured by Oji Scientific Instruments Co., Ltd.). Re was 0 nm and Rth was −115 nm at a wavelength of 550 nm.

<Formation of First Adhesive Precursor>

A UV curable resin was applied to the polarizer side surface of the polarizing plate 01 and dried. Thus, a first adhesive precursor was formed.

<Transfer of First Optically Anisotropic Layer>

The surface of the first optically anisotropic layer for transfer prepared above was brought into contact with the surface of the first adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the first optically anisotropic layer firmly adhered to the adhesive layer.

Next, the rear surface of the temporary substrate was pressed with a highly adhesive roller while rotating and the temporary substrate and the alignment film were peeled off.

<Formation of Second Adhesive Precursor>

A UV curable resin was applied to the surface of the first optically anisotropic layer prepared above and was dried. Thus, a second adhesive precursor was formed.

<Transfer of Second Optically Anisotropic Layer>

The surface of the second optically anisotropic layer for transfer prepared above was brought into contact with the surface of the second adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the second optically anisotropic layer firmly adhered to the adhesive layer.

Next, the rear surface of the temporary substrate was pressed with a highly adhesive roller while rotating and the temporary substrate and the alignment film were peeled off.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 29

<Preparation of Temporary Substrate>

Z-TAC (manufactured by Fujifilm Corporation) was used as a temporary substrate.

<Formation of Alignment Film>

An alignment film coating solution Z having the following composition was directly applied to the surface of the temporary substrate prepared above using a #14 wire bar without a saponification treatment. The applied solution was dried with warm air at 60° C. for 120 seconds and thus an alignment film was formed.

| Composition of Alignment Film Coating solution Z | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

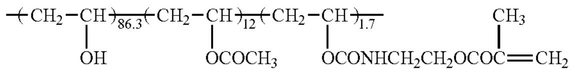

Modified polyvinyl alcohol

<Preparation of First Optically Anisotropic Layer>

The coating solution C for an optically anisotropic layer was applied to the temporary substrate on which the alignment film was formed without saponification using a #2.0 bar coater. Next, the applied solution was heated and aged at a film surface temperature of 70° C. for 90 seconds and irradiated with ultraviolet rays with an irradiation dose of 290 $mJ/cm^2$ at a film surface temperature of 70° C. under air using an air-cooled metal halide lamp (manufactured by Eye Graphics Co., Ltd.) to fix the alignment state immediately after the heating and aging. Through these procedures, a first optically anisotropic layer for transfer was formed. In the formed first optically anisotropic layer, the discotic liquid crystal compound was horizontally aligned. The light incident angle dependency of Re and Rth was measured with an automatic birefringence meter (KOBRA-21ADH manufactured by Oji Scientific Instruments Co., Ltd.). Re was 0 nm and Rth was 75 nm at a wavelength of 550 nm.

<Preparation of Second Optically Anisotropic Layer>

The temporary substrate on which the alignment film was formed without saponification was rubbed in the direction parallel with the longitudinal direction of the film. The coating solution D for an optically anisotropic layer was applied to the rubbed surface using a #4.4 bar coater. Next, the applied solution was heated and aged at a film surface temperature of 70° C. for 90 seconds and irradiated with ultraviolet rays with an irradiation dose of 290 $mJ/cm^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer for transfer was formed. In the formed second optically anisotropic layer, the discotic liquid crystal compound was vertically aligned and the direction of the slow axis was perpendicular to the rubbing direction, that is, the direction of the slow axis was perpendicular to the direction of the longitudinal direction of the film. The light incident angle dependency of Re and Rth was measured with an automatic birefringence meter (KOBRA-21ADH manufactured by Oji Scientific Instruments Co., Ltd.). Re was 158 nm and Rth was −79 nm at a wavelength of 550 nm.

<Formation of First Adhesive Precursor>

A UV curable resin was applied to the polarizer side surface of the polarizing plate 01 and dried. Thus, a first adhesive precursor was formed.

<Transfer of First Optically Anisotropic Layer>

The surface of the first optically anisotropic layer for transfer prepared above was brought into contact with the surface of the first adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the first optically anisotropic layer firmly adhered to the adhesive layer.

Next, the rear surface of the temporary substrate was pressed with a highly adhesive roller while rotating and the temporary substrate and the alignment film were peeled off.

<Formation of Second Adhesive Precursor>

A UV curable resin was applied to the surface of the first optically anisotropic layer prepared above and was dried. Thus, a second adhesive precursor was formed.

<Transfer of Second Optically Anisotropic Layer>

The surface of the second optically anisotropic layer for transfer prepared above was brought into contact with the surface of the second adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the second optically anisotropic layer firmly adhered to the adhesive layer.

Next, the rear surface of the temporary substrate was pressed with a highly adhesive roller while rotating and the temporary substrate and the alignment film were peeled off.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 30

<Preparation of Temporary Substrate>

Z-TAC (manufactured by Fujifilm Corporation) was used as a temporary substrate.

<Formation of Alignment Film>

An alignment film coating solution W having the following composition was directly applied to the surface of the temporary substrate prepared above using a #14 wire bar without a saponification treatment. The applied solution was dried with warm air at 60° C. for 120 seconds and thus an alignment film was formed.

| Composition of Alignment Film Coating solution W | |
|---|---|
| Modified polyvinyl alcohol shown below | 10 parts by mass |
| Water | 371 parts by mass |
| Methanol | 119 parts by mass |
| Glutaraldehyde | 0.5 parts by mass |

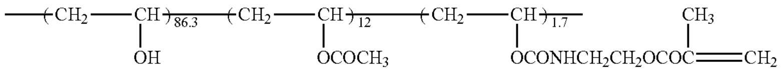

Modified polyvinyl alcohol

<Preparation of First Optically Anisotropic Layer>

The temporary substrate on which the alignment film was formed without saponification was rubbed in the direction perpendicular to the longitudinal direction of the film. A coating solution whose concentration was adjusted such that the amount of methyl ethyl ketone used in the coating solution A for an optically anisotropic layer was adjusted to 347 parts by mass was applied to the rubbed surface using a #2.0 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer for transfer was formed. In the formed first optically anisotropic layer, the rod-like liquid crystal compound was horizontally aligned and the direction of the slow axis was parallel with the rubbing direction, that is, the direction of the slow axis was perpendicular to the longitudinal direction of the film. The light incident angle dependency of Re and Rth was measured with an automatic birefringence meter (KOBRA-21ADH manufactured by Oji Scientific Instruments Co., Ltd.). Re was 75 nm and Rth was 38 nm at a wavelength of 550 nm.

<Preparation of Second Optically Anisotropic Layer>

A coating solution whose concentration was adjusted such that the amount of MEK used in the coating solution D for an optically anisotropic layer was adjusted to 260 parts by mass was applied to the temporary substrate on which the alignment film was formed without saponification using a #3.2 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was vertically aligned and the direction of the slow axis was perpendicular to the rubbing direction, that is, the direction of the slow axis was perpendicular to the direction of the absorption axis of the polarizer. The light incident angle dependency of Re was measured with an automatic birefringence meter (KOBRA-21ADH manufactured by Oji Scientific Instruments Co., Ltd.). Re was 125 nm at a wavelength of 550 nm.

<Formation of First Adhesive Precursor>

A UV curable resin was applied to the polarizer side surface of the polarizing plate 01 and dried. Thus, a first adhesive precursor was formed.

<Transfer of First Optically Anisotropic Layer>

The surface of the first optically anisotropic layer for transfer prepared above was brought into contact with the surface of the first adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the first optically anisotropic layer firmly adhered to the adhesive layer.

Next, the rear surface of the temporary substrate was pressed with a highly adhesive roller while rotating and the temporary substrate and the alignment film were peeled off.

<Formation of Second Adhesive Precursor>

A UV curable resin was applied to the surface of the first optically anisotropic layer prepared above and was dried. Thus, a second adhesive precursor was formed.

<Transfer of Second Optically Anisotropic Layer>

The surface of the second optically anisotropic layer for transfer prepared above was brought into contact with the surface of the second adhesive precursor prepared above to be laminated such that the direction of the absorption axis of the polarizer coincided with the longitudinal direction of the film and pressed with a pressing roller. Then, the laminate was irradiated with UV light to cure the UV curable resin so that the second optically anisotropic layer firmly adhered to the adhesive layer.

Next, the rear surface of the temporary substrate was pressed with a highly adhesive roller while rotating and the temporary substrate and the alignment film were peeled off.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 31

<Formation of First Optically Anisotropic Layer>

1 g of Compound 1 described in WO2013/018526A, 30 mg of a photopolymerization initiator (trade name: IRGACURE 907 manufactured by BASF), and 100 mg of a 1% cyclopentanone solution of a surfactant (trade name: KH-40 manufactured by AGC SEIMI CHEMICAL CO., LTD.) were dissolved in 2.3 g of cyclopentanone. This solution was filtered through a disposable filter having a pore size of 0.45 μm and a liquid crystal composition was obtained.

The above liquid crystal composition was applied to the polarizer side surface of the polarizing plate 01 which had been rubbed in the direction perpendicular to the absorption axis of the polarizer, that is, in the direction perpendicular to the longitudinal direction of the polarizer, using a #4 wire bar. The coating film was dried at 90° C. for 30 seconds and thus a liquid crystal layer having a film thickness of 2 μm was formed. Thereafter, the coated surface of the liquid crystal layer was irradiated with ultraviolet rays with an irradiation dose of 2,000 mJ/cm$^2$ and thus a first optically anisotropic layer was obtained.

<Measurement of Optical Properties>

The first optically anisotropic layer was formed on the glass substrate under the same conditions as in Examples and the light incident angle dependency of Re and Rth of only the first optically anisotropic layer was measured with an automatic birefringence meter (KOBRA-21ADH manufactured by Oji Scientific Instruments Co., Ltd.). Re was 128 nm and Rth was 64 nm at a wavelength of 550 nm.

<Formation of Second Optically Anisotropic Layer and Preparation of Polarizing Plate>

A second optically anisotropic layer was formed in the same manner as in Example 1 except that the first optically anisotropic layer prepared above was used, and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 32

<Formation of First Optically Anisotropic Layer>

A coating solution E for an optically anisotropic layer, which will be described later, was applied to the polarizer side surface of the polarizing plate 01 using a #2.0 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the discotic liquid crystal compound was horizontally aligned. The light incident angle dependency of Re and Rth was measured with an automatic birefringence meter (KOBRA-21ADH manufactured by Oji Scientific Instruments Co., Ltd.). Re was 0 nm and Rth was 75 nm at a wavelength of 550 nm.

Composition of Coating Solution E for Optically Anisotropic Layer

| | |
|---|---|
| Discotic liquid crystal compound 3 | 91.0 parts by mass |
| Polymerizable compound | 9.0 parts by mass |
| Photopolymerization initiator 1 (IRGACURE 907 manufactured by BASF) | 3.0 parts by mass |
| Sensitizer (KAYACURE-DETX manufactured by Nippon Kayaku Co., Ltd.) | 1.0 part by mass |
| Fluorinated compound F | 0.8 parts by mass |
| Adhesion improver 2 | 0.5 parts by mass |
| Methyl ethyl ketone | 169 parts by mass |

Discotic liquid crystal compound 3

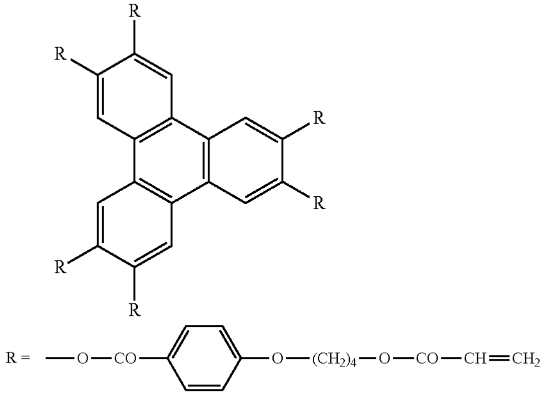

Fluorinated compound F

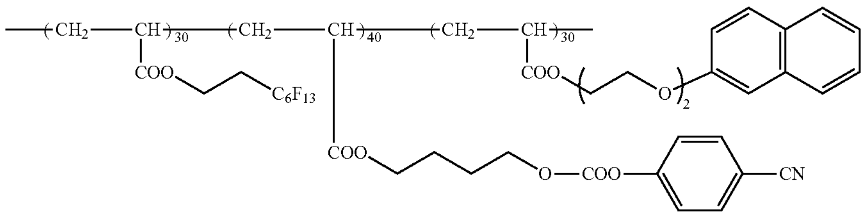

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and thus an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

The following coating solution F for an optically anisotropic layer was applied to the alignment film using a #4.0 bar coater. Next, the applied solution was heated and aged at a film surface temperature of 70° C. for 90 seconds and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was vertically aligned and the direction of the slow axis was perpendicular to the rubbing direction, that is, the direction of the slow axis was perpendicular to the direction of the absorption axis of the polarizer. The light incident angle dependency of Re and Rth was measured with an automatic birefringence meter (KOBRA-21 ADH manufactured by Oji Scientific Instruments Co., Ltd.). Re was 158 nm and Rth was −79 nm at a wavelength of 550 nm.

| Composition of Coating Solution F for Optically Anisotropic Layer | |
|---|---|
| Discotic liquid crystal compound 3 | 91.0 parts by mass |
| Polymerizable compound | 5.0 parts by mass |
| Photopolymerization initiator 1 (IRGACURE 907 manufactured by BASF) | 3.0 parts by mass |
| Sensitizer (KAYACURE-DETX manufactured by Nippon Kayaku Co., Ltd.) | 1.0 part by mass |
| Fluorinated compound A | 0.21 parts by mass |
| Fluorinated compound G | 0.1 parts by mass |
| Vertical aligning agent 1 | 0.5 parts by mass |
| Methyl ethyl ketone | 154 parts by mass |

halide lamp (manufactured by Eye Graphics Co., Ltd.) to fix the alignment state immediately after the heating and aging. Through these procedures, a first optically anisotropic layer was formed. In the formed first optically anisotropic layer, the rod-like liquid crystal compound was horizontally aligned and the direction of the slow axis was parallel with the rubbing direction, that is, the direction of the slow axis was perpendicular to the direction of the absorption axis of the polarizer. The light incident angle dependency of Re and Rth was measured with an automatic birefringence meter (KOBRA-21ADH manufactured by Oji Scientific Instruments Co., Ltd.). Re was 75 nm and Rth was 38 nm at a wavelength of 550 nm.

<Formation of Alignment Film>

The alignment film coating solution used in Example 1 was continuously applied to the surface of the first optically anisotropic layer prepared above using a #14 wire bar. The applied solution was dried with warm air at 60° C. for 120 seconds and thus an alignment film was formed.

The surface of the formed alignment film was rubbed in the direction parallel with the direction of the absorption axis of the polarizer, that is, in the direction parallel with the longitudinal direction of the film.

<Preparation of Second Optically Anisotropic Layer>

A coating solution whose concentration was adjusted such that the amount of methyl ethyl ketone used in the coating solution E for an optically anisotropic layer was adjusted to 222 parts by mass was applied to the alignment film using a #4.4 bar coater. Next, the applied solution was heated and aged at a film surface temperature of 70° C. for 90 seconds Fluorinated compound A

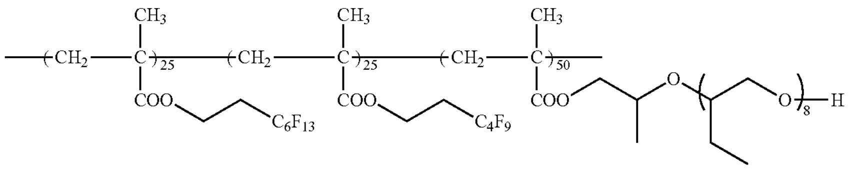

Fluorinated compound G

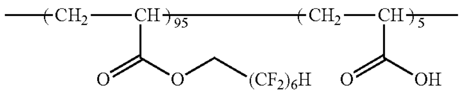

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 33

<Preparation of First Optically Anisotropic Layer>

The polarizer side surface of the polarizing plate 01 was rubbed in the direction perpendicular to the absorption axis of the polarizer. A coating solution whose concentration was adjusted such that the amount of methyl ethyl ketone used in the coating solution A for an optically anisotropic layer was adjusted to 347 parts by mass was prepared and applied to the rubbed surface using a #2.0 bar coater. Next, the applied solution was heated and aged at a film surface temperature of 60° C. for 30 seconds and irradiated with ultraviolet rays with an irradiation dose of 290 mJ/cm$^2$ at a film surface temperature of 60° C. under air using an air-cooled metal and irradiated with ultraviolet rays with an irradiation dose of 290 mJ/cm$^2$ at a film surface temperature of 70° C. under air using an air-cooled metal halide lamp (manufactured by Eye Graphics Co., Ltd.) to fix the alignment state immediately after the heating and aging. Through these procedures, a second optically anisotropic layer was formed. In the formed second optically anisotropic layer, the discotic liquid crystal compound was vertically aligned and the direction of the slow axis was perpendicular to the rubbing direction, that is, the direction of the slow axis was perpendicular to the direction of the absorption axis of the polarizer. The light incident angle dependency of Re and Rth was measured with an automatic birefringence meter (KOBRA-21ADH manufactured by Oji Scientific Instruments Co., Ltd.). Re was 125 nm and Rth was −63 nm at a wavelength of 550 nm.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 34

A polarizing plate was prepared in the same manner as in Example 11 except that a first optically anisotropic layer was formed by changing the bar coater used in the formation of the first optically anisotropic layer in Example 31 to a #2.4 bar coater.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate. The evaluation results are shown in Table 5.

Example 35

<Formation of First Optically Anisotropic Layer>

The polarizer side surface of the polarizing plate 01 was rubbed in the direction perpendicular to the absorption axis of the polarizer. The following coating solution W for an optically anisotropic layer was applied to the rubbed surface using a bar coater. Next, the applied solution was heated and aged at a film surface temperature of 60° C. for 60 seconds and irradiated with ultraviolet rays with an irradiation dose of 290 mJ/cm$^2$ at a film surface temperature of 60° C. under air using an air-cooled metal halide lamp (manufactured by Eye Graphics Co., Ltd.) to fix the alignment state immediately after the heating and aging. Through these procedures, a first optically anisotropic layer was formed. In the formed first optically anisotropic layer, the rod-like liquid crystal compound was horizontally aligned and the direction of the slow axis was parallel with the rubbing direction, that is, the direction of the slow axis was perpendicular to the direction of the absorption axis of the polarizer. The light incident angle dependency of Re was measured with an automatic birefringence meter (KOBRA-21ADH manufactured by Oji Scientific Instruments Co., Ltd.). Re was 128 nm at a wavelength of 550 nm.

| Composition of Coating Solution W for Optically Anisotropic Layer (Smectic Liquid Crystal Phase) | |
|---|---|
| Rod-like liquid crystal compound W | 81 parts by mass |
| Compound X | 18 parts by mass |
| Photopolymerization initiator (IRGACURE 907 manufactured by Ciba Specialty Chemicals Inc.) | 3.0 parts by mass |
| Sensitizer (KAYACURE-DETX manufactured by Nippon Kayaku Co., Ltd.) | 1.0 part by mass |
| Fluorinated compound Y | 0.6 parts by mass |
| Methyl ethyl ketone | 0.7 parts by mass |
| Chloroform | 400 parts by mass |

Rod-like liquid crystal compound W

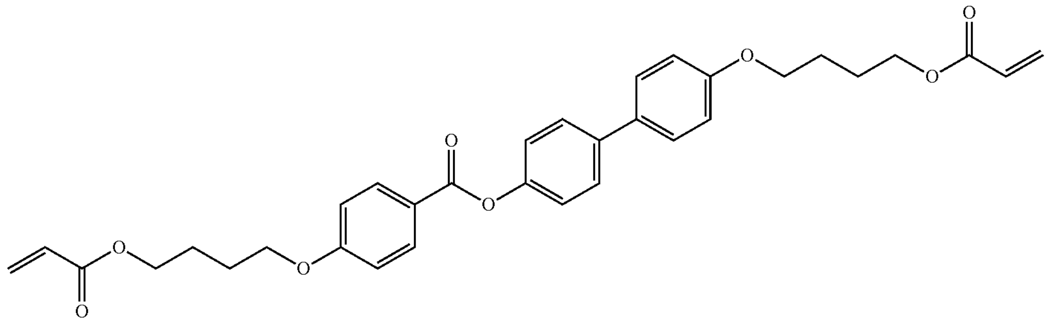

Compound X

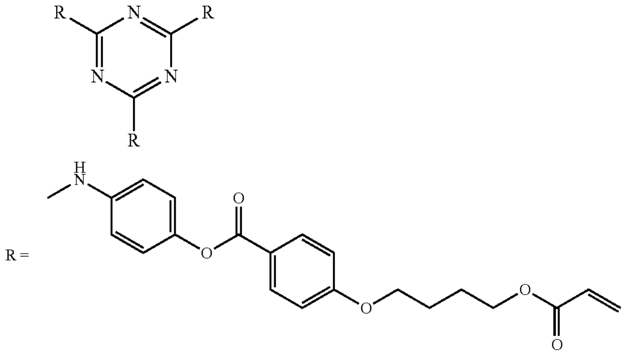

Flourinated Compound Y

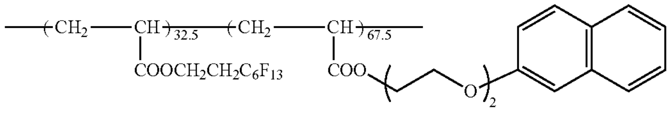

<Formation of Second Optically Anisotropic Layer and Preparation of Polarizing Plate>

A second optically anisotropic layer was formed on the first optically anisotropic layer in the same manner as in Example 1 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used. The evaluation results are shown in Table 5.

Example 36

<Formation of First Optically Anisotropic Layer>

A first optically anisotropic layer was prepared in the same manner as in the formation of the first optically anisotropic layer in Example 35 except that the amount of methyl ethyl ketone used was changed to 0.8 parts by mass and the amount of chloroform used was changed to 756 parts by mass. In the formed first optically anisotropic layer, the rod-like liquid crystal compound was horizontally aligned and the direction of the slow axis was parallel with the rubbing direction, that is, the direction of the slow axis was perpendicular to the direction of the absorption axis of the polarizer. The light incident angle dependency of Re was measured with an automatic birefringence meter (KOBRA-21ADH manufactured by Oji Scientific Instruments Co., Ltd.). Re was 75 nm at a wavelength of 550 nm.

<Formation of Second Optically Anisotropic Layer and Preparation of Polarizing Plate>

A second optically anisotropic layer was formed on the first optically anisotropic layer in the same manner as in Example 11 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used. The evaluation results are shown in Table 5.

In Table 5, "Re/Rth" represents values of Re(550) and Rth(550), respectively.

In addition, in Table 5, "Wavelength dispersion" represents Re(450)/Re(550) in the case in which Re(550) of each optically anisotropic layer is more than 10 nm and represents (R[40°, 450])/(R[40°, 550]) in the case in which Re(550) of each optically anisotropic layer is 10 nm or less.

Further, in Examples 25, 28, 31, and 34, when the surface of the first polarizer protective layer was observed from the normal direction, an angle formed between the slow axis of the first optically anisotropic layer and the absorption axis of the first polarizer was 90°.

In Examples 26, 29, 32, and 35, when the surface of the first polarizer protective layer was observed from the normal direction, an angle formed between the slow axis of the second optically anisotropic layer and the absorption axis of the first polarizer was 90°.

In Examples 27, 30, 33, and 36, when the surface of the first polarizer protective layer was observed from the normal direction, an angle formed between the slow axis of the first optically anisotropic layer and the absorption axis of the first polarizer was 90° and an angle formed between the slow axis of the second optically anisotropic layer and the absorption axis of the first polarizer was 90°.

In Table 5, the thickness of each of the first optically anisotropic layer and the second optically anisotropic layer is shown.

The thickness of the visible side polarizing plate in Table 5 refers to the total thickness value of the first polarizer protective layer, the first polarizer, the first optically anisotropic layer, and the second optically anisotropic layer.

The thickness of the backlight side polarizing plate in Table 5 refers to the total thickness value of the second polarizer protective layer and the second polarizer.

The thickness of the polarizing plate obtained in each Example was 100 μm or less.

TABLE 5

| | | | Example 25 | Example 26 | Example 27 | Example 28 | Example 29 | Example 30 |
|---|---|---|---|---|---|---|---|---|
| Visible side polarizing plate | First polarizer protective layer | Thickness [μm] | 25 | 25 | 25 | 25 | 25 | 25 |
| | | Moisture permeability [g/m$^2$ · day] | 980 | 980 | 980 | 980 | 980 | 980 |
| | First polarizer | Thickness [μm] | 15 | 15 | 15 | 15 | 15 | 15 |
| | First optically anisotropic layer | Re/Rth [nm/nm] | 128/64 | 0/75 | 75/38 | 128/64 | 0/75 | 75/38 |
| | | Wavelength dispersion | 1.09 | 1.09 | 1.09 | 1.09 | 1.09 | 1.09 |
| | | Thickness [μm] | 1.05 | 0.68 | 0.62 | 1.05 | 0.68 | 0.62 |
| | Second optically anisotropic layer | Re/Rth [nm/nm] | 0/−115 | 158/−79 | 125/−63 | 0/−115 | 158/−79 | 125/−63 |
| | | Wavelength dispersion | 1.09 | 1.09 | 1.09 | 1.09 | 1.09 | 1.09 |
| | | Thickness [μm] | 0.95 | 1.64 | 1.3 | 0.95 | 1.64 | 1.3 |
| Backlight side polarizing plate | Second polarizer | Thickness [μm] | 15 | 15 | 15 | 15 | 15 | 15 |
| | Second polarizer protective layer | Thickness [μm] | 25 | 25 | 25 | 25 | 25 | 25 |
| | | Moisture permeability [g/m$^2$ · day] | 980 | 980 | 980 | 980 | 980 | 980 |
| Thickness of visible side polarizing plate [μm] | | | 42 | 42.32 | 41.92 | 42 | 42.32 | 41.92 |
| Thickness of backlight side polarizing plate [μm] | | | 40 | 40 | 40 | 40 | 40 | 40 |
| Evaluation item | Display performance | Oblique light leakage | A | A | A | A | A | A |
| | | Oblique color variation | A | A | A | A | A | A |
| | Durability evaluation | Display unevenness | A | A | A | A | A | A |

TABLE 5-continued

| | | | Example 31 | Example 32 | Example 33 | Example 34 | Example 35 | Example 36 |
|---|---|---|---|---|---|---|---|---|
| Visible side polarizing plate | First polarizer protective layer | Thickness [μm] | 25 | 25 | 25 | 25 | 25 | 25 |
| | | Moisture permeability [g/m$^2$ · day] | 980 | 980 | 980 | 980 | 980 | 980 |
| | First polarizer | Thickness [μm] | 15 | 15 | 15 | 15 | 15 | 15 |
| | First optically anisotropic layer | Re/Rth [nm/nm] | 128/64 | 0/75 | 75/38 | 75/38 | 128/64 | 75/38 |
| | | Wavelength dispersion | 0.9 | 1.15 | 1.09 | 0.9 | 1.09 | 1.09 |
| | | Thickness [μm] | 2 | 1.02 | 0.62 | 0.62 | 1 | 1 |
| | Second optically anisotropic layer | Re/Rth [nm/nm] | 0/−115 | 158/−79 | 125/−63 | 125/−63 | 0/−115 | 125/−63 |
| | | Wavelength dispersion | 1.09 | 1.15 | 1.15 | 1.09 | 1.09 | 1.09 |
| | | Thickness [μm] | 0.95 | 2.1 | 1.66 | 2 | 1 | 2 |
| Backlight side polarizing plate | Second polarizer | Thickness [μm] | 15 | 15 | 15 | 15 | 15 | 15 |
| | Second polarizer protective layer | Thickness [μm] | 25 | 25 | 25 | 25 | 25 | 25 |
| | | Moisture permeability [g/m$^2$ · day] | 980 | 980 | 980 | 980 | 980 | 980 |
| Thickness of visible side polarizing plate [μm] | | | 42.95 | 43.12 | 42.28 | 42.62 | 42 | 43 |
| Thickness of backlight side polarizing plate [μm] | | | 40 | 40 | 40 | 40 | 40 | 40 |
| Evaluation item | Display performance | Oblique light leakage | A | A | A | A | A | A |
| | | Oblique color variation | A | A | A | A | A | A |
| | Durability evaluation | Display unevenness | A | A | A | A | A | A |

As shown in Table 5, it was confirmed that even in the case in which an alignment film was provided, a desired effect could be obtained.

Example F

Example 37

<Preparation of Protective Layer>

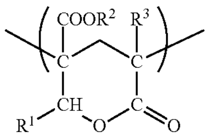

A pellet of [a mixture of 90 parts by mass of (meth)acrylic resin having a lactone ring structure represented by the above formula, wherein $R^1$ represents a hydrogen atom and $R^2$ and $R^3$ represent a methyl group, {copolymerizable monomer mass ratio-methyl methacrylate/methyl 2-(hydroxymethyl) acrylate=8/2, lactone cyclization ratio: about 100%, content ratio of the lactone ring structure: 19.4%, weight average molecular weight: 133,000, melt flow rate: 6.5 g/10 min (240° C., 10 kgf), Tg: 131° C.} and 10 parts by mass of acrylonitrile-styrene (AS) resin {Toyo AS AS20 manufactured by Toyo-Styrene Co., Ltd.}; Tg: 127° C.] was supplied to a twin-screw extruder and melted and extruded in a sheet form at about 280° C. to obtain a (meth)acrylic resin sheet having a lactone ring structure. This unstretched sheet was stretched vertically and horizontally under the temperature condition of 160° C. and thus a thermoplastic resin film (thickness: 40 μm, in-plane phase difference Re: 0.8 nm, phase difference in thickness direction Rth: 1.5 nm) was obtained.

The prepared thermoplastic resin film was subjected to a corona treatment and then laminated on one surface of the polarizer 1 with an acrylic adhesive and thereby a polarizing plate 03 with a protective layer on one surface (hereinafter, also simply referred to as a polarizing plate 03) was prepared.

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 except that the polarizing plate 03 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 03 was used as the backlight side polarizing plate. The evaluation results are shown in Table 6.

Example 38

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 except that the polarizing plate 03 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 03 was used as the backlight side polarizing plate. The evaluation results are shown in Table 6.

Example 39

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 except that the polarizing plate 03 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 03 was used as the backlight side polarizing plate. The evaluation results are shown in Table 6.

Example 40

<Preparation of Protective Layer>

(Composition of Composition B-1)

| | |
|---|---|
| A-DCP (100%): tricyclodecane dimethanol dimethacrylate [manufactured by Shin-Nakamura Chemical Co., Ltd.] | 97.0 parts by mass |
| IRGACURE 907 (100%): polymerization initiator [manufactured by Ciba Specialty Chemicals Inc.] | 3.0 parts by mass |
| SP-13 (leveling agent): | 0.04 parts by mass |
| MEK (methyl ethyl ketone): | 81.8 parts by mass |

SP-13

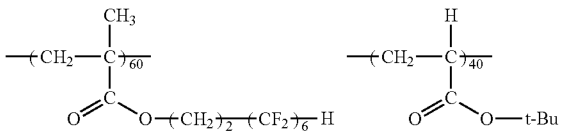

Mw 14,000

(Preparation of Substrate Film)

The composition described below was put into a mixing tank and was stirred while being heating to dissolve the respective components. Thus, a dope was prepared.

{Cellulose Ester}

A cellulose ester having a total degree of substitution of acyl groups of 2.75, an acetyl substitution degree of 0.19, a propionyl substitution degree of 2.56, and a weight average molecular weight of 200,000 was used.

The cellulose ester was synthesized as described below.

A sulfuric acid (7.8 parts by mass with respect to 100 parts by mass of cellulose) was added to cellulose as a catalyst, a carboxylic acid working out to raw material of the acyl substituent was added thereto, and an acylation reaction was conducted at 40° C. At this time, the degree of substitution of the acetyl group and the propionyl group was adjusted by adjusting the amount of the carboxylic acid. In addition, after the acylation, the aging was performed at a temperature of 40° C. Further, the low molecular weight components of the cellulose ester were removed by the washing with acetone.

(Composition of Dope)

| | |
|---|---|
| Cellulose ester | 30.0 parts by mass |
| Acrylic resin (DIANAL BR85 manufactured by Mitsubishi Rayon Co., Ltd.) | 70.0 parts by mass |
| TINUVIN 328 manufactured by Ciba Japan, K.K. | 1.0 part by mass |
| Methylene chloride | 320 parts by mass |
| Ethanol | 45 parts by mass |

The dope prepared above was uniformly cast from a casting die onto a stainless steel endless band (casting support) using a band casting device. When the amount of the residual solvent in the dope reached 40% by mass, the dope in the form of a polymer film was peeled off from the casting support, and the film was conveyed by a tenter while being not actively stretched and was dried in a drying zone at 130° C.

The thickness of the obtained film was 40 μm. In addition, when the values of Re and Rth of the obtained substrate film was measured, Re=1.0 nm and Rth=5.0 nm. This film was used as the substrate film.

Composition B-1 mentioned above was used and applied to the substrate film by a die coating method using the slot die described in Example 1 of JP2006-122889A at a conveyance rate of 30 m/min and the composition was dried at 60° C. for 150 seconds. Thereafter, the coating layer was cured upon irradiation with ultraviolet rays having an illuminance of 400 $mW/cm^2$ and an irradiation dose of 60 $mJ/cm^2$ by using an air-cooled metal halide lamp (manufactured by Eye Graphics Co., Ltd.) of 160 W/cm under purging with nitrogen (oxygen concentration of about 0.1%), followed by winding up. The amount of coating was adjusted such that the film thickness of the coating layer was 12 μm. The obtained optical film was used as a protective layer A.

<Preparation of Polarizing Plate>

The prepared protective layer A was subjected to a corona treatment and then the protective layer A was laminated on one surface of the polarizer 1 with an acrylic adhesive. Thus, a polarizing plate 04 with a protective layer on one surface (hereinafter, also referred to as a polarizing plate 04) was prepared.

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 except that the polarizing plate 04 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 04 was used as the backlight side polarizing plate. The evaluation results are shown in Table 6.

Example 41

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 except that the polarizing plate 04 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 04 was used as the backlight side polarizing plate. The evaluation results are shown in Table 6.

Example 42

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 except that the polarizing plate 04 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 04 was used as the backlight side polarizing plate. The evaluation results are shown in Table 6.

Example 43

<Preparation of Protective Layer>

<Stretched PET 100 μm>

(Raw Material Polyester 1)

As described below, a raw material polyester 1 (Sb catalyst-based PET) was obtained by a continuous polymerization apparatus by a direct esterification method which includes directly reacting terephthalic acid and ethylene glycol with each other, distilling water off, carrying out esterification, and then carrying out polycondensation under a reduced pressure.

(1) Esterification Reaction 4.7 tons of high purity terephthalic acid and 1.8 tons of ethylene glycol were mixed for 90 minutes to form slurry, and the slurry was continuously supplied to the first esterification reaction tank at a flow rate of 3,800 kg/h. Further, an ethylene glycol solution of antimony trioxide was continuously supplied, and a reaction was carried out at a temperature inside the reaction tank of 250° C. for an average retention time of approximately 4.3 hours under stirring. At this time, the antimony trioxide was continuously added such that the amount of Sb added was 150 ppm in terms of an element.

This reaction product was transferred to a second esterification reaction tank, and the reaction product was allowed to react under stirring at a temperature inside the reaction tank of 250° C. for an average retention time of 1.2 hours. An ethylene glycol solution of magnesium acetate and an ethylene glycol solution of trimethyl phosphate were continuously supplied to the second esterification reaction tank such that the amount of Mg added was 65 ppm in terms of an element and the amount of P added was 35 ppm in terms of an element, respectively.

(2) Polycondensation Reaction

The esterification reaction product obtained above was continuously supplied to a first polycondensation reaction tank, and polycondensation was carried out under stirring at a reaction temperature of 270° C. and a pressure inside the reaction tank of 20 torr ($2.67\times10^{-3}$ MPa) for an average retention time of approximately 1.8 hours.

Further, the reaction product was transferred to a second polycondensation reaction tank, and in this reaction tank, a reaction (polycondensation) was carried out under stirring under the conditions of a temperature inside the reaction tank of 276° C. and a pressure inside the reaction tank of 5 torr ($6.67\times10^{-4}$ MPa) for a retention time of approximately 1.2 hours.

Next, the reaction product was further transferred to a third polycondensation reaction tank, and in this reaction tank, a reaction (polycondensation) was carried out under conditions of a temperature inside the reaction tank of 278° C. and a pressure inside the reaction tank of 1.5 torr ($2.0\times10^{-4}$ MPa) for a retention time of 1.5 hours, whereby a reaction product (polyethylene terephthalate (PET)) was obtained.

Subsequently, the obtained reaction product was discharged in cold water into a strand shape, and the strands were immediately cut to prepare pellets of polyester <cross-section: major axis of about 4 mm and minor axis of about 2 mm, and length: about 3 mm>.

The intrinsic viscosity IV of the obtained polymer was 0.63. This polymer was set as a raw material polyester 1.

The intrinsic viscosity IV was obtained by dissolving the raw material polyester 1 in a 1,1,2,2-tetrachloroethane/phenol (=2/3 [mass ratio]) mixed solvent and measuring the intrinsic viscosity from the solution viscosity at 25° C. in the mixed solvent.

(Raw Material Polyester 2)

10 parts by mass of a dried ultraviolet absorbent (2,2'-(1,4-phenylene)bis(4H-3,1-benzoxazinon-4-one)) and 90 parts by mass of the raw material polyester 1 (IV=0.63) were mixed and a raw material polyester 2 containing an UV absorbent was obtained by using a kneading extruder.

Preparation Example

<Co-Extruded Three-Layer PET 80 μm>

—Film Forming Process—

The raw material polyester 1 (90 parts by mass) and the raw material polyester 2 containing an ultraviolet absorbent (10 parts by mass) were dried to have a moisture content of 20 ppm or less, then put into a hopper 1 of a single-screw kneading extruder 1 with a diameter of 50 mm, and melted at 300° C. by the extruder 1 (intermediate II layer). In addition, the raw material polyester 1 was dried to have a moisture content of 20 ppm or less, then put into a hopper 2 of a single-screw kneading extruder 2 with a diameter of 30 mm, and melted at 300° C. by the extruder 2 (outer I layer, outer III layer)

These two types of molten polymers were led to pass through a gear pump and a filter (pore diameter of 20 μm) and then formed into a three-layer dual merging block of two types of polymers. The polymers were laminated such that the polymer extruded from the extruder 1 became an intermediate layer (II layer) and the polymer extruded from the extruder 2 became outer layers (I layer and III layer) and extruded from the die in the form of sheets.

The melt resin was extruded from the die under the melt resin extrusion conditions of a pressure change of 1% and a temperature distribution of 2% in the melt resin. Specifically, for the back pressure, pressure was applied by pressure 1% higher than the average pressure inside the barrel of the extruder, and for the piping temperature of the extruder, heating was performed at a temperature 2% higher than the average temperature inside the barrel of the extruder.

The melt resin extruded from the die was extruded onto a cooling cast drum whose temperature was set to a temperature of 25° C. and was allowed to closely adhere to the cooling cast drum by using a static electricity applying method. An unstretched polyester film 2 was obtained by peeling off the melt resin by using a peeling roll disposed opposite to the cooling cast drum. At this time, the discharge amount of each extruder was adjusted such that the thickness ratio among the 1 layer, the II layer, and the III layer was 10:80:10.

The obtained unstretched polyester film 2 was stretched in the cross direction under the following conditions and thus a PET film having a thickness of 80 μm, a retardation Re in the in-plane direction of 8,200 nm, and a retardation Rth in the film thickness direction of 9,400 nm (hereinafter, abbreviated as a stretched co-cast three-layer PET 80 μm) was produced.

{Conditions}

Cross-direction stretching temperature: 90° C.

Cross-direction stretching magnification: 4.3 times (Heat Fixation Part)

Next, a heat fixation treatment was performed while the film surface temperature of the polyester film was controlled to the following range.

{Conditions}

Heat fixation temperature: 180° C.

Heat fixation time: 15 seconds (Heat Relaxation Part)

The polyester film after heat fixation was relaxed by heating the film to the following temperature.

{Conditions}

Heat relaxation temperature: 170° C.

Heat relaxation ratio: TD direction (film width direction, cross direction) 2%

(Cooling Part)

Subsequently, the polyester film after heat relaxation was cooled at a cooling temperature of 50° C.

<Stretched PET 80 μm with HC Layer>

—Formation of Easily Adhesive Layer—

(1) Formation of Hard coat layer Side Easily Adhesive Layer

The following compounds were mixed at the following ratio and a coating solution H1 for a hard coat layer side easily adhesive layer was prepared. The coating solution H1 for a hard coat layer side easily adhesive layer was applied to the stretched co-cast three-layer PET 80 μm obtained above so as to have a film thickness of 0.09 μm.

| Coating Solution H1 for Hard coat layer Side Easily Adhesive Layer | |
|---|---|
| Polyester resin: (IC) | 60 parts by mass |
| Acrylic resin: (II) | 25 parts by mass |
| Melamine compound: (VIB) | 10 parts by mass |
| Particles: (VII) | 5 parts by mass |

Hereinafter, the used compounds will be shown in detail.

Polyester resin: (IC)

Sulfonic acid-based aqueous dispersion of polyester resin obtained by copolymerization of monomers of the following composition Monomer composition: (acid components) terephthalic acid/isophthalic acid/sodium 5-sulfoisophthalate//(diol components) ethylene glycol/1,4-butane diol/diethylene glycol=56/40/4//70/20/10 (mol %)

Acrylic resin: (II)

Water dispersion of acrylic resin obtained by polymerization of monomers of the following composition Emulsified polymer of ethyl acrylate/n-butyl acrylate/methyl methacrylate/N-methylol acrylamide/acrylic acid=65/21/10/2/2 (% by mass) (emulsifier: anionic surfactant)

Water dispersion of urethane resin obtained by neutralizing a prepolymer composed of 400 parts by mass of polycarbonate polyol composed of 1,6-hexanediol and diethyl carbonate and having a number average molecular weight of 2,000, 10.4 parts by mass of neopentylglycol, 58.4 parts by mass of isophorone diisocyanate, and 74.3 parts by mass of dimethylolbutanoic acid with triethylamine and extending the chain length with isophoronediamine Melamine compound: (VIB) Hexamethoxymetyl melamine Particles: (VII) Silica sol having an average particle diameter of 65 nm (Formation of Hard Coat Layer by Coating)

Thereafter, a mixed coating solution (Acryl-1) having the following composition was applied to the surface of the stretched co-cast three-layer PET 80 μm obtained above to which the coating solution H1 for a hard coat layer side easily adhesive layer was applied and dried such that the thickness of the dried film was 5 μm. The dried film was irradiated with ultraviolet rays and cured to form a hard coat layer.

| | |
|---|---|
| Dipentaerythritol hexaacrylate | 85 parts by mass |
| 2-hydroxy-3-phenoxypropyl acrylate | 15 parts by mass |
| Photopolymerization initiator (trade name: IRGACURE 184, manufactured by Ciba Specialty Chemicals Inc.) | 5 parts by mass |
| Methyl ethyl ketone | 200 parts by mass |

The PET film with the hard coat layer obtained in the above manner was used as a stretched PET 80 μm with a HC layer.

(Adhesion of Polarizer and Protective Film)

The protective film (PET film with the hard coat layer) prepared in the above preparation example was used to be laminated on the polarizer through the adhesive layer according to the following manner.

(Formation of Polarizer Side Easily Adhesive Layer)

The following compounds were mixed at the following ratio and thus a coating solution P1 for a polarizer side easily adhesive layer was prepared.

| (1) Synthesis of Copolymerization Polyester Resin (A-1) | |
|---|---|
| Dimethyl terephthalate | 194.2 parts by mass |
| Dimethyl isophthalate | 184.5 parts by mass |
| Sodium dimethyl-5-sulfoisophthalate | 14.8 parts by mass |
| Diethylene glycol | 233.5 parts by mass |
| Ethylene glycol | 136.6 parts by mass |
| Tetra-n-butyl titanate | 0.2 parts by mass |

The above compounds were mixed, followed by an ester exchange reaction at a temperature ranging from 160° C. to 220° C. for 4 hours. Next, the temperature was increased to 255° C. and the pressure of the reaction system was gradually reduced. Thereafter, under the reduced pressure of 30 Pa, the reaction was conducted for 1 hour and 30 minutes and thus a copolymerization polyester resin (A-1) was obtained.

| (2) Preparation of Polyester Water Dispersion (Aw-1) | |
|---|---|
| Copolymerization polyester resin (A-1) | 30 parts by mass |
| Ethylene glycol n-butyl ether | 15 parts by mass |

The above compounds were placed and stirred while being heated at 110° C. to dissolve the resin. After the resin was completely dissolved, 55 parts by mass of water was gradually added to the polyester solution under stirring. After the addition, the solution was cooled to room temperature while being stirred and thus a creamy white polyester water dispersion (Aw-1) having a solid content of 30% by mass was prepared.

(3) Preparation of Aqueous Polyvinyl Alcohol Solution (Bw-1)

90 parts by mass of water was placed and while being stirred, 10 parts by mass of a polyvinyl alcohol resin (manufacture by Kuraray Co., Ltd.) (B-1) having a saponification degree of 88% and a polymerization degree of 500 was gradually added. After the addition, the solution was heated to 95° C. while being stirred to dissolve the resin. After the resin was dissolved, the solution was cooled to room temperature while being stirred and thus an aqueous polyvinyl alcohol solution (Bw-1) having a solid content of 10% by mass was prepared.

| | |
|---|---|
| Polyisocyanate compound having isocyanurate structure using hexamethylene diisocyanate as raw material (DURANATE TPA manufactural by Asahi Kasei Chemicals Corporation) | 100 parts by mass |
| Propyleneglycol monomethylether acetate | 55 parts by mass |
| Polyethyleneglycol monomethylether (average molecular weight: 750) | 30 parts by mass |

The above compounds were mixed and held under nitrogen atmosphere at 70° C. for 4 hours. Then, the temperature of the reaction solution was lowered to 50° C. and 47 parts by mass of methyl ethyl ketoxime was added dropwise. The infrared spectrum of the reaction solution was measured and confirmed that the absorption of isocyanate group was disappeared to obtain a block polyisocyanate water dispersion (C-1) having a solid content of 75% by mass.

The following coating materials were mixed to prepare a coating solution P1 for a polarizer side easily adhesive layer in which a mass ratio of polyester-based resin (A)/polyvinyl alcohol-based resin (B) was 70/30.

| | |
|---|---|
| Water | 40.61% by mass |
| Isopropanol | 30.00% by mass |
| Polyester water dispersion (Aw-1) | 11.67% by mass |
| Aqueous polyvinyl alcohol solution (Bw-1) | 15.00% by mass |
| Block polyisocyanate water dispersion (C-1) | 0.67% by mass |
| Particles (silica sol having an average particle diameter of 100 nm, solid content concentration: 40% by mass) | 1.25% by mass |
| Catalyst (organotin-based compound, solid content concentration: 14% by mass) | 0.3% by mass |
| Surfactant (silicone based, solid content concentration: 10% by mass) | 0.5% by mass |

(Coating of Easily Adhesive Layer on Polyester Film)

The coating solution P1 for a polarizer side easily adhesive layer was applied to one side of the polyester film by a reverse roll method while adjusting the amount of the coating solution such that the amount of coating after drying was 0.12 g/m$^2$.

The surface of the polyester film sample to which coating solution P for a polarizer side easily adhesive layer was applied was set to a polarizer side and the polarizer 1 was laminated thereon in a roll-to-roll process to obtain a laminate. The obtained laminate was heated at 70° C. and a relative humidity of 60% while being conveyed the laminate onto the roll to cure the adhesive for lamination. In this manner, a polarizing plate 05 with a protective layer on one surface (hereinafter, also referred to as a polarizing plate 05) was prepared.

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 1 except that the polarizing plate 05 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 05 was used as the backlight side polarizing plate. The evaluation results are shown in Table 6.

Example 44

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 6 except that the polarizing plate 05 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 05 was used as the backlight side polarizing plate. The evaluation results are shown in Table 6.

Example 45

<Formation of First Optically Anisotropic Layer, Formation of Second Optically Anisotropic Layer, and Preparation of Polarizing Plate>

A first optically anisotropic layer and a second optically anisotropic layer were formed in the same manner as in Example 11 except that the polarizing plate 05 prepared above was used instead of the polarizing plate 01 and thereby a polarizing plate was prepared.

<Preparation of Liquid Crystal Display Device>

A liquid crystal display device was prepared and evaluated in the same manner as in Example 1 except that the polarizing plate having the first optically anisotropic layer and the second optically anisotropic layer prepared above was used as the visible side polarizing plate and the polarizing plate 05 was used as the backlight side polarizing plate. The evaluation results are shown in Table 6.

In Table 6, "Re/Rth" represents values of Re(550) and Rth(550), respectively.

In addition, in Table 6, "Wavelength dispersion" represents Re(450)./Re(550) in the case in which Re(550) of each optically anisotropic layer is more than 10 nm and represents (R[40°, 450])/(R[40°, 550]) in the case in which Re(550) of each optically anisotropic layer is 10 nm or less.

Further, in Examples 37, 40, and 43, when the surface of the first polarizer protective layer was observed from the normal direction, an angle formed between the slow axis of the first optically anisotropic layer and the absorption axis of the first polarizer was 90°.

In Examples 38, 41, and 44, when the surface of the first polarizer protective layer was observed from the normal direction, an angle formed between the slow axis of the second optically anisotropic layer and the absorption axis of the first polarizer was 90°.

In Examples 39, 42, and 45, when the surface of the first polarizer protective layer was observed from the normal direction, an angle formed between the slow axis of the first optically anisotropic layer and the absorption axis of the first polarizer was 90° and an angle formed between the slow axis of the second optically anisotropic layer and the absorption axis of the first polarizer was 90°.

In Table 6, the thickness of each of the first optically anisotropic layer and the second optically anisotropic layer is shown.

The thickness of the visible side polarizing plate in Table 6 refers to the total thickness value of the first polarizer protective layer, the first polarizer, the first optically anisotropic layer, and the second optically anisotropic layer.

The thickness of the backlight side polarizing plate in Table 6 refers to the total thickness value of the second polarizer protective layer and the second polarizer.

The thickness of the polarizing plate obtained in each Example was 100 μm or less.

TABLE 6

| | | | Example 37 | Example 38 | Example 39 | Example 40 | Example 41 |
|---|---|---|---|---|---|---|---|
| Visible side polarizing plate | First polarizer protective layer | Thickness [μm] | 40 | 40 | 40 | 52 | 52 |
| | | Moisture permeability [g/m$^2$ · day] | 70 | 70 | 70 | 40 | 40 |
| | First polarizer | Thickness [μm] | 15 | 15 | 15 | 15 | 15 |
| | First optically anisotropic layer | Re/Rth [nm/nm] | 128/64 | 0/75 | 75/38 | 128/64 | 0/75 |
| | | Wavelength dispersion | 1.09 | 1.09 | 1.09 | 1.09 | 1.09 |
| | | Thickness [μm] | 1.05 | 0.68 | 0.62 | 1.05 | 0.68 |
| | Second optically anisotropic layer | Re/Rth [nm/nm] | 0/−115 | 158/−79 | 125/−63 | 0/−115 | 158/−79 |
| | | Wavelength dispersion | 1.09 | 1.09 | 1.09 | 1.09 | 1.09 |
| | | Thickness [μm] | 0.95 | 1.64 | 1.3 | 0.95 | 1.64 |
| Backlight side polarizing plate | Second polarizer | Thickness [μm] | 15 | 15 | 15 | 15 | 15 |
| | Second polarizer protective layer | Thickness [μm] | 40 | 40 | 40 | 52 | 52 |
| | | Moisture permeability [g/m$^2$ · day] | 70 | 70 | 70 | 40 | 40 |
| Thickness of visible side polarizing plate [μm] | | | 57 | 57.32 | 56.92 | 69 | 69.32 |
| Thickness of backlight side polarizing plate [μm] | | | 55 | 55 | 55 | 67 | 67 |
| Evaluation item | Display performance | Oblique light leakage | A | A | A | A | A |
| | | Oblique color variation | A | A | A | A | A |
| | Durability evaluation | Display unevenness | AA | AA | AA | AA | AA |

| | | | Example 42 | Example 43 | Example 44 | Example 45 |
|---|---|---|---|---|---|---|
| Visible side polarizing plate | First polarizer protective layer | Thickness [μm] | 52 | 80 | 80 | 80 |
| | | Moisture permeability [g/m$^2$ · day] | 40 | 10 | 10 | 10 |
| | First polarizer | Thickness [μm] | 15 | 15 | 15 | 15 |
| | First optically anisotropic layer | Re/Rth [nm/nm] | 75/38 | 128/64 | 0/75 | 75/38 |
| | | Wavelength dispersion | 1.09 | 1.09 | 1.09 | 1.09 |
| | | Thickness [μm] | 0.62 | 1.05 | 0.68 | 0.62 |
| | Second optically anisotropic layer | Re/Rth [nm/nm] | 125/−63 | 0/−115 | 158/−79 | 125/−63 |
| | | Wavelength dispersion | 1.09 | 1.09 | 1.09 | 1.09 |
| | | Thickness [μm] | 1.3 | 0.95 | 1.64 | 1.3 |
| Backlight side polarizing plate | Second polarizer | Thickness [μm] | 15 | 15 | 15 | 15 |
| | Second polarizer protective layer | Thickness [μm] | 52 | 80 | 80 | 80 |
| | | Moisture permeability [g/m$^2$ · day] | 40 | 10 | 10 | 10 |
| Thickness of visible side polarizing plate [μm] | | | 68.92 | 97 | 97.32 | 96.92 |
| Thickness of backlight side polarizing plate [μm] | | | 67 | 95 | 95 | 95 |
| Evaluation item | Display performance | Oblique light leakage | A | A | A | A |
| | | Oblique color variation | A | A | A | A |
| | Durability evaluation | Display unevenness | AA | AA | AA | AA |

As shown in Table 6, it was confirmed that in the case in which the moisture permeability of the first polarizer protective layer and the second polarizer protective layer was 100 g/m$^2$-day or less, the durability evaluation was more excellent.

EXPLANATION OF REFERENCES

10*a*, 10*b*, 10*c*, 50: Polarizing plate
12: First polarizer protective layer
14: First polarizer
16*a*, 16*b*, 16*c*: First optically anisotropic layer
18*a*, 18*b*, 18*c*: Second optically anisotropic layer
20: Alignment film
22: Adhesive layer
30: Liquid crystal display device
32: First polarizing plate
34: Liquid crystal cell
36: Second polarizing plate
40: Second polarizer protective layer
42: Second polarizer
44: Third optically anisotropic layer

What is claimed is:

1. A polarizing plate comprising, in this order:
a first polarizer protective layer;
a first polarizer;
a first optically anisotropic layer including a liquid crystal compound X; and
a second optically anisotropic layer including a liquid crystal compound Y,
wherein the thickness of the first optically anisotropic layer is 10 μm or less,
the first optically anisotropic layer satisfies the following expressions (1-1) and (1-2), $95\ \text{nm} \leq Re(550) \leq 155\ \text{nm}$ Expression (1-1)

$45\ \text{nm} \leq Rth(550) \leq 80\ \text{nm}$ Expression (1-2)

the thickness of the second optically anisotropic layer is 10 μm or less,
the second optically anisotropic layer satisfies the following expressions (1-3) and (1-4):

$Re(550) \leq 10\ \text{nm}$; and Expression (1-3)

$-135\ \text{nm} \leq Rth(550) \leq -75\ \text{nm}$, and Expression (1-4)

the polarizing plate has a thickness of 100 μm or less,
wherein Re(550) represents an in-plane retardation at a wavelength of 550 nm and Rth(550) represents a retardation in a thickness direction at a wavelength of 550 nm, and
wherein the first polarizer is in direct contact with the first optically anisotropic layer.

2. The polarizing plate according to claim 1,
wherein at least one of the liquid crystal compound X or the liquid crystal compound Y is a rod-like liquid crystal compound, and when the surface of the first polarizer protective layer is observed from a normal direction, an angle formed between a slow axis of the first optically anisotropic layer and an absorption axis of the first polarizer is 90°.

3. A polarizing plate comprising, in this order:
a first polarizer protective layer;
a first polarizer;
a first optically anisotropic layer including a liquid crystal compound X; and
a second optically anisotropic layer including a liquid crystal compound Y,
wherein the thickness of the first optically anisotropic layer is 10 μm or less,
the first optically anisotropic layer satisfies the following expressions (2-1) and (2-2):

$Re(550) \leq 10\ \text{nm}$; and Expression (2-1)

$40\ \text{nm} \leq Rth(550) \leq 115\ \text{nm}$, Expression (2-2)

the thickness of the second optically anisotropic layer is 10 μm or less,
the second optically anisotropic layer satisfies the following expressions (2-3) and (2-4):

$125\ \text{nm} \leq Re(550) \leq 185\ \text{nm}$; and Expression (2-3)

$-95\ \text{nm} \leq Rth(550) \leq -60\ \text{nm}$, and Expression (2-4)

the polarizing plate has a thickness of 100 μm or less,
wherein Re(550) represents an in-plane retardation at a wavelength of 550 nm and Rth(550) represents a retardation in a thickness direction at a wavelength of 550 nm, and
wherein the first polarizer is in direct contact with the first optically anisotropic layer.

4. The polarizing plate according to claim 3,
wherein at least one of the liquid crystal compound X or the liquid crystal compound Y is a discotic liquid crystal compound, and when the surface of the first polarizer protective layer is observed from a normal direction, an angle formed between a slow axis of the second optically anisotropic layer and an absorption axis of the first polarizer is 90°.

5. A polarizing plate comprising, in this order:
a first polarizer protective layer;
a first polarizer;
a first optically anisotropic layer including a liquid crystal compound X; and
a second optically anisotropic layer including a liquid crystal compound Y,
wherein the thickness of the first optically anisotropic layer is 10 μm or less,
the first optically anisotropic layer satisfies the following expressions (3-1) and (3-2):

$40\ \text{nm} \leq Re(550) \leq 110\ \text{nm}$; and Expression (3-1)

$20\ \text{nm} \leq Rth(550) \leq 55\ \text{nm}$, Expression (3-2)

the thickness of the second optically anisotropic layer is 10 μm or less,
the second optically anisotropic layer satisfies the following expressions (3-3) and (3-4):

$90\ \text{nm} \leq Re(550) \leq 155\ \text{nm}$; and Expression (3-3)

$-80\ \text{nm} \leq Rth(550) \leq -45\ \text{nm}$, and Expression (3-4)

the polarizing plate has a thickness of 100 μm or less,
wherein Re(550) represents an in-plane retardation at a wavelength of 550 nm and Rth(550) represents a retardation in a thickness direction at a wavelength of 550 nm, and
wherein the first polarizer is in direct contact with the first optically anisotropic layer.

6. The polarizing plate according to claim 5,
wherein the liquid crystal compound X is a rod-like liquid crystal compound, the liquid crystal compound Y is a discotic liquid crystal compound, and when the surface of the first polarizer protective layer is observed from a normal direction, an angle formed between a slow axis of the first optically anisotropic layer and an absorption axis of the first polarizer is 90° and an angle formed between a slow axis of the second optically anisotropic layer and an absorption axis of the first polarizer is 90°.

7. The polarizing plate according to claim 1, wherein at least one of the first optically anisotropic layer or the second optically anisotropic layer satisfies the following requirement (A) or (B):

$Re(550)>10$ nm and $0.83\leq Re(450)/Re(550)<1.16$ are satisfied; and Requirement (A):

$Re(550)\leq 10$ nm and $0.83\leq (R[40°,450])/(R[40°,550])<1.16$ are satisfied, Requirement (B):

wherein Re(550) represents an in-plane retardation at a wavelength of 550 nm, Rth(550) represents a retardation in a thickness direction at a wavelength of 550 nm, R[40°, 450] represents a retardation measured at a wavelength of 450 nm in a direction inclined at 40° from the normal direction of the surface of the optically anisotropic layer, and R[40°, 550] represents a retardation measured at a wavelength of 550 nm in a direction inclined at 40° from the normal direction of the surface of the optically anisotropic layer.

8. A liquid crystal display device comprising, in this order:

a first polarizing plate including a polarizer;

an IPS mode or a FFS mode liquid crystal cell including a liquid crystal layer having a liquid crystal compound; and a second polarizing plate including a polarizer, wherein an absorption axis of the polarizer in the first polarizing plate is perpendicular to an absorption axis of the polarizer in the second polarizing plate, and either the first polarizing plate or the second polarizing plate is the polarizing plate according to claim 1, and the second optically anisotropic layer is disposed on the liquid crystal cell side.

9. The liquid crystal display device according to claim 8, wherein the first polarizing plate is disposed on a visible side, the first polarizing plate is the polarizing plate according to claim 1, the second polarizing plate has a second polarizer protective layer, a second polarizer, and a third optically anisotropic layer including a liquid crystal compound Z, the third optically anisotropic layer is disposed on a liquid crystal cell side, an slow axis of the third optically anisotropic layer is parallel with a slow axis of the liquid crystal layer in a state in which voltage is not applied, and the liquid crystal compound Z has an average tilt angle in the same direction as the average tilt direction of the liquid crystal compound in the liquid crystal layer with respect to the surface of the liquid crystal layer.

10. The liquid crystal display device according to claim 9, wherein the thickness of the third optically anisotropic layer is 10 μm or less, and the third optically anisotropic layer satisfies the following expression (4-1):

$10\text{ nm}\leq Re(550)\leq 120\text{ nm}$, and Expression (4-1)

the average tilt angle of the liquid crystal compound Z is 1° to 20°.

11. The liquid crystal display device according to claim 9, wherein the liquid crystal compound Z is a rod-like liquid crystal compound.

12. The liquid crystal display device according to claim 9, wherein the liquid crystal compound Z forms a smectic phase.

13. The liquid crystal display device according to claim 9, wherein the third optically anisotropic layer satisfies the following expression (I), $0.83\leq Re(450)/Re(550)<1.1$ Expression (I)

wherein Re(550) represents an in-plane retardation at a wavelength of 550 nm and Re(450) represents an in-plane retardation at a wavelength of 450 nm.

14. The liquid crystal display device according to claim 9, wherein the second polarizer is in direct contact with the third optically anisotropic layer.

15. The liquid crystal display device according to claim 9, wherein an alignment film is disposed between the second polarizer and the third optically anisotropic layer.

16. The liquid crystal display device according to claim 9, wherein an adhesive layer is disposed between the second polarizer and the third optically anisotropic layer.

17. The polarizing plate according to claim 1, wherein the moisture permeability of the first polarizer protective layer at 40° C. and 90% RH is 100 $g/m^2\cdot$day or less, wherein the moisture permeability is a value obtained by a method of JIS Z-0208 after 24 hours have passed at 40° C. and a relative humidity of 90%.

18. The liquid crystal display device according to claim 9, wherein the moisture permeability of at least one of the first polarizer protective layer or the second polarizer protective layer at 40° C. and 90% RH is 100 $g/m^2\cdot$day or less, wherein the moisture permeability is a value obtained by a method of JIS Z-0208 after 24 hours have passed at 40° C. and a relative humidity of 90%.

19. A polarizing plate comprising, in this order:

a first polarizer protective layer;

a first polarizer;

a first optically anisotropic layer including a liquid crystal compound X; and a second optically anisotropic layer including a liquid crystal compound Y, wherein the thickness of the first optically anisotropic layer is 10 μm or less, the first optically anisotropic layer satisfies the following expressions (2-1) and (2-2):

$Re(550)\leq 10$ nm; and Expression (2-1)

$40\text{ nm}\leq Rth(550)\leq 115\text{ nm}$, Expression (2-2)

the thickness of the second optically anisotropic layer is 10 μm or less, the second optically anisotropic layer satisfies the following expressions (2-3) and (2-4):

$125\text{ nm}\leq Re(550)\leq 185\text{ nm}$; and Expression (2-3)

$-95\text{ nm}\leq Rth(550)\leq -60\text{ nm}$, and Expression (2-4)

the polarizing plate has a thickness of 100 μm or less, wherein Re(550) represents an in-plane retardation at a wavelength of 550 nm and Rth(550) represents a retardation in a thickness direction at a wavelength of 550 nm, wherein an alignment film is disposed between the first polarizer and the first optically anisotropic layer.

20. A polarizing plate comprising, in this order:

a first polarizer protective layer;

a first polarizer;

a first optically anisotropic layer including a liquid crystal compound X; and a second optically anisotropic layer including a liquid crystal compound Y, wherein the thickness of the first optically anisotropic layer is 10 μm or less, the first optically anisotropic layer satisfies the following expressions (3-1) and (3-2):

$$40\text{ nm} \leq Re(550) \leq 110\text{ nm; and} \quad \text{Expression (3-1)}$$

$$20\text{ nm} \leq Rth(550) \leq 55\text{ nm,} \quad \text{Expression (3-2)}$$

the thickness of the second optically anisotropic layer is 10 μm or less, the second optically anisotropic layer satisfies the following expressions (3-3) and (3-4):

$$90\text{ nm} \leq Re(550) \leq 155\text{ nm; and} \quad \text{Expression (3-3)}$$

$$-80\text{ nm} \leq Rth(550) \leq -45\text{ nm, and} \quad \text{Expression (3-4)}$$

the polarizing plate has a thickness of 100 μm or less, wherein Re(550) represents an in-plane retardation at a wavelength of 550 nm and Rth(550) represents a retardation in a thickness direction at a wavelength of 550 nm, wherein an alignment film is disposed between the first polarizer and the first optically anisotropic layer.

* * * * *